(12) United States Patent
Zhang et al.

(10) Patent No.: US 12,488,049 B2
(45) Date of Patent: Dec. 2, 2025

(54) FEDERATED GRAPH NEURAL NETWORK FOR FAST ANOMALY DETECTION IN CONTROLLER AREA NETWORKS

(71) Applicant: George Mason University, Fairfax, VA (US)

(72) Inventors: Hengrun Zhang, Fairfax, VA (US); Kai Zeng, Fairfax, VA (US)

(73) Assignee: George Mason University, Fairfax, VA (US)

( * ) Notice: Subject to any disclaimer, the term of this patent is extended or adjusted under 35 U.S.C. 154(b) by 249 days.

(21) Appl. No.: 18/227,474

(22) Filed: Jul. 28, 2023

(65) Prior Publication Data

US 2024/0064160 A1     Feb. 22, 2024

Related U.S. Application Data

(60) Provisional application No. 63/393,336, filed on Jul. 29, 2022.

(51) Int. Cl.
*G06F 16/901* (2019.01)
*G06N 3/044* (2023.01)
(Continued)

(52) U.S. Cl.
CPC ......... *G06F 16/9024* (2019.01); *G06N 3/044* (2023.01); *G06N 3/088* (2013.01);
(Continued)

(58) Field of Classification Search
CPC . G06F 16/9024; G06F 16/2372; G06N 3/044; G06N 3/08; G06N 3/045;
(Continued)

(56) References Cited

U.S. PATENT DOCUMENTS

2017/0300593 A1\* 10/2017 Inoue .................. G06F 16/9024
2021/0287067 A1\* 9/2021 Zavoronkovs ......... G06N 3/044
2023/0385732 A1\* 11/2023 Huo ........................ G06N 3/088

OTHER PUBLICATIONS

Tibshirani et al., "Diagnosis of Multiple Cancer Types by Shrunken Centroids of Gene Expression," in Proceedings of the National Academy of Sciences of the United States of America, vol. 99, No. 10 (May 14, 2002), pp. 6567-6572.

(Continued)

*Primary Examiner* — Kyung H Shin
(74) *Attorney, Agent, or Firm* — Leveque Intellectual Property Law, P.C.

(57) ABSTRACT

A method and apparatus for intrusion detection includes generating graph data from a sequence of messages in a communication network. The graph data denotes a node for each message identifier in the sequence of messages and an edge for each pair of consecutive message identifiers. Pair counts are generated for edges in the graph data as a number of times the associated pair of consecutive message identifiers occurs in the sequence. Input feature vectors are generated for nodes in the graph data. The vectors include data content of messages associated with the node and a pair count for each edge connected to the node. The input feature vectors are processed through a first graph neural network, based on the graph data, and then through one or more layers of a classifier to classify the sequence of messages as containing an anomaly or not.

20 Claims, 13 Drawing Sheets

(51) Int. Cl.
G06N 3/088 (2023.01)
H04L 9/40 (2022.01)
H04L 12/40 (2006.01)
H04L 41/16 (2022.01)

(52) U.S. Cl.
CPC .............. *H04L 12/40* (2013.01); *H04L 41/16* (2013.01); *H04L 63/1425* (2013.01); *H04L 2012/40215* (2013.01)

(58) Field of Classification Search
CPC ...... G06N 3/084; G06N 3/088; G06N 3/0442; G06N 3/0455; G06Q 10/0633; G06Q 10/0635
See application file for complete search history.

(56) References Cited

OTHER PUBLICATIONS

Tomlinson et al., "Towards Viable Intrusion Detection Methods for the Automotive Controller Area Network," CSCS 2018, Sep. 13-14, 2018, Munich, Germany.
Upstream Security, 2021 Global Automotive Cybersecurity Report, https://upstream.auto/2021report/, 2021.
Wei et al., "Federated Learning With Differential Privacy: Algorithms and Performance Analysis," in IEEE Transactions on Information Forensics and Security, vol. 15, pp. 3454-3469, 2020.
Wu et al., "A Comprehensive Survey on Graph Neural Networks," in IEEE Transactions on Neural Networks and Learning Systems, vol. 32, No. 1, pp. 4-24, Jan. 2021.
Wu et al., "A Survey of Intrusion Detection for In-Vehicle Networks," in IEEE Transactions on Intelligent Transportation Systems, vol. 21, No. 3, pp. 919-933, Mar. 2020.
Yang et al., "Tree-Based Intelligent Intrusion Detection System in Internet of Vehicles," 2019 IEEE Global Communications Conference (GLOBECOM), Waikoloa, HI, USA, 2019, pp. 1-6.
Zhang et al., "An end-to-end deep learning architecture for graph classification," In Proceedings of the Thirty-Second AAAI Conference on Artificial Intelligence and Thirtieth Innovative Applications of Artificial Intelligence Conference and Eighth AAAI Symposium on Educational Advances in Artificial Intelligence (AAAI'18/IAAI'18/EAAI'18). AAAI Press, Article 544, 4438-4445.
Zhang et al., "Predicting Failures of Vision Systems," 2014 IEEE Conference on Computer Vision and Pattern Recognition, Columbus, OH, USA, 2014, pp. 3566-3573.
Amato et al., "CAN-Bus Attack Detection With Deep Learning," in IEEE Transactions on Intelligent Transportation Systems, vol. 22, No. 8, pp. 5081-5090, Aug. 2021.
Baccouche et al., "Sequential Deep Learning for Human Action Recognition," Human Behavior Understanding. HBU 2011. Lecture Notes in Computer Science, vol. 7065. Springer, Berlin, Heidelberg.
Bagdasaryan et al., "How to Backdoor Federated Learning," in Proceedings of the Twenty Third International Conference on Artificial Intelligence and Statistics, Palermo, Italy, vol. 108, 2020.
Bendale et al., "Towards Open Set Deep Networks," arXiv:1511.06233v1, Nov. 19, 2015.
Bendale et al., "Towards Open World Recognition," 2015 IEEE Conference on Computer Vision and Pattern Recognition (CVPR), Boston, MA, USA, 2015, pp. 1893-1902.
Blanchard et al., Machine learning with adversaries: byzantine tolerant gradient descent. In Proceedings of the 31st International Conference on Neural Information Processing Systems (NIPS'17). Curran Associates Inc., Red Hook, NY, USA, 118-128.
Bonawitz et al, "Practical Secure Aggregation for Privacy-Preserving Machine Learning," In Proceedings of the 2017 ACM SIGSAC Conference on Computer and Communications Security (CCS '17). Association for Computing Machinery, New York, NY, USA, 1175-1191.
Choi et al., "Identifying ECUs Using Inimitable Characteristics of Signals in Controller Area Networks," in IEEE Transactions on Vehicular Technology, vol. 67, No. 6, pp. 4757-4770, Jun. 2018.
Damaskinos et al., "Aggregathor: Byzantine Machine Learning via Robust Gradient Aggregation," in Part of Proceedings of Machine Learning and Systems 1 (MLSys 2019).
Ding et al., "A deep hybrid learning model to detect unsafe behavior: Integrating convolution neural networks and long short-term memory," Automation in Construction, vol. 86, 2018, pp. 118-124.
Gierlichs et al., Cryptographic Hardware and Embedded Systems—CHES 2016, in Proceedings 18th International Conference Santa Barbara, CA, USA, Aug. 17-19, 2016. Uploaded as Part 1 and Part 2.
Groza et al, "Efficient Intrusion Detection With Bloom Filtering in Controller Area Networks," in IEEE Transactions on Information Forensics and Security, vol. 14, No. 4, pp. 1037-1051, Apr. 2019.
Guo et al., "Multi-stage Deep Classifier Cascades for Open World Recognition," In Proceedings of the 28th ACM International Conference on Information and Knowledge Management (CIKM '19). Association for Computing Machinery, New York, NY, USA, 179-188.
Hanselmann et al., "CANet: An Unsupervised Intrusion Detection System for High Dimensional CAN Bus Data," in IEEE Access, vol. 8, pp. 58194-58205, 2020.
Iehira et al., "Spoofing attack using bus-off attacks against a specific ECU of the CAN bus," 2018 15th IEEE Annual Consumer Communications & Networking Conference (CCNC), Las Vegas, NV, USA, 2018, pp. 1-4.
Islam et al., "Graph-Based Intrusion Detection System for Controller Area Networks," in IEEE Transactions on Intelligent Transportation Systems, vol. 23, No. 3, pp. 1727-1736, Mar. 2022.
Jedh et al., "Detection of Message Injection Attacks Onto the CAN Bus Using Similarities of Successive Messages-Sequence Graphs," in IEEE Transactions on Information Forensics and Security, vol. 16, pp. 4133-4146, 2021.
K. Koscher et al., "Experimental Security Analysis of a Modern Automobile," 2010 IEEE Symposium on Security and Privacy, Oakland, CA, USA, 2010, pp. 447-462.
Kang et al., "Intrusion Detection System Using Deep Neural Network for In-Vehicle Network Security," PLoS One 11 (6): e0155781, Jun. 7, 2016.
Kingma et al., "Adam: A Method for Stochastic Optimization," ICLR 2015.
Kosmanos et al., "A novel Intrusion Detection System against spoofing attacks in connected Electric Vehicles," Array, vol. 5, 2020, 100013.
Lee et al., "OTIDS: A Novel Intrusion Detection System for In-vehicle Network by Using Remote Frame," 2017 15th Annual Conference on Privacy, Security and Trust (PST), Calgary, AB, Canada, 2017, pp. 57-5709.
Li et al., "Federated Optimization in Heterogeneous Networks," arXiv:1812.06127v5, in Proceedings of the 3rd MLSys Conference, Austin, TX, USA, 2020.
Lin et al., "Cyber-Security for the Controller Area Network (CAN) Communication Protocol," 2012 International Conference on Cyber Security, Alexandria, VA, USA, 2012, pp. 1-7.
Longari et al., "CANnolo: An Anomaly Detection System Based on LSTM Autoencoders for Controller Area Network," in IEEE Transactions on Network and Service Management, vol. 18, No. 2, pp. 1913-1924, Jun. 2021.
Marchetti et al., "Anomaly detection of CAN bus messages through analysis of ID sequences," 2017 IEEE Intelligent Vehicles Symposium (IV), Los Angeles, CA, USA, 2017, pp. 1577-1583.
Marchetti et al., "Evaluation of anomaly detection for in-vehicle networks through information-theoretic algorithms," 2016 IEEE 2nd International Forum on Research and Technologies for Society and Industry Leveraging a better tomorrow (RTSI), Bologna, Italy, 2016, pp. 1-6.
Marchetti et al., "READ: Reverse Engineering of Automotive Data Frames," in IEEE Transactions on Information Forensics and Security, vol. 14, No. 4, pp. 1083-1097, Apr. 2019.

(56) References Cited

OTHER PUBLICATIONS

Martinelli et al., "Who's Driving My Car? A Machine Learning based Approach to Driver Identification," In Proceedings of the 4th International Conference on Information Systems Security and Privacy (ICISSP 2018), 367-372.

McMahan et al., "Communication-Efficient Learning of Deep Networks from Decentralized Data," arXiv:1602.05629v4, in Proceedings of the 20th International Conference on Artificial Intelligenceand Statistics (AISTATS) 2017, Fort Lauderdale, Florida, USA. JMLR: W&CP vol. 54.

Muter et al., "Entropy-based anomaly detection for in-vehicle networks," 2011 IEEE Intelligent Vehicles Symposium (IV), Baden-Baden, Germany, 2011, pp. 1110-1115.

Nilsson et al., "Vehicle ECU classification based on safety-security characteristics," IET Road Transport Information and Control—RTIC 2008 and ITS United Kingdom Members' Conference, Manchester, 2008, pp. 1-7.

Othmane et al., "On the Performance of Detecting Injection of Fabricated Messages into the CAN Bus," in IEEE Transactions on Dependable and Secure Computing, vol. 19, No. 1, pp. 468-481, Jan. 1-Feb. 2022.

Pesé et al., "S2-CAN: Sufficiently Secure Controller Area Network," In Proceedings of the 37th Annual Computer Security Applications Conference (ACSAC '21). Association for Computing Machinery, New York, NY, USA, 425-438.

Rahmani et al., "Learning a Deep Model for Human Action Recognition from Novel Viewpoints," IEEE Transactions on Pattern Analysis and Machine Intelligence, Apr. 5, 2017.

Rouf et al., "Security and privacy vulnerabilities of in-car wireless networks: A tire pressure monitoring system case study," in Proceedings of the 19th USENIX Security Symposium, 19th USENIX Security Symposium; Washington; United States, pp. 323-338.

Ruff et al., "Deep One-Class Classification," in Proceedings of the 35th International Conference on Machine Learning, PMLR 80:4393-4402, 2018.

Russakovsky et al., "ImageNet Large Scale Visual Recognition Challenge," Int J Comput Vis, vol. 115, Apr. 11, 2015, pp. 211-252.

Salah et al., "Human Behavior Understanding," in Proceedings of the 6th International Workshop on Human Behavior Understanding, HBU 2015, held in Osaka, Japan, in Sep. 2015.

Scheirer et al., "Meta-Recognition: The Theory and Practice of Recognition Score Analysis," in IEEE Transactions on Pattern Analysis and Machine Intelligence, vol. 33, No. 8, pp. 1689-1695, Aug. 2011.

Schölkopf et al., "Estimating the Support of a High-Dimensional Distribution," Neural Comput. 13, 7 (Jul. 2001), 1443-1471.

Seo et al., "GIDS: GAN based Intrusion Detection System for In-Vehicle Network," 2018 16th Annual Conference on Privacy, Security and Trust (PST), Belfast, Ireland, 2018, pp. 1-6.

So et al., "Byzantine-Resilient Secure Federated Learning," in IEEE Journal on Selected Areas in Communications, vol. 39, No. 7, pp. 2168-2181, Jul. 2021.

Song et al., "Discovering CAN Specification Using On-Board Diagnostics," in IEEE Design & Test, vol. 38, No. 3, pp. 93-103, Jun. 2021.

Song et al., "Intrusion detection system based on the analysis of time intervals of CAN messages for in-vehicle network," 2016 International Conference on Information Networking (ICOIN), Kota Kinabalu, Malaysia, 2016, pp. 63-68.

Sun et al., "Anomaly Detection for In-Vehicle Network Using CNN-LSTM With Attention Mechanism," in IEEE Transactions on Vehicular Technology, vol. 70, No. 10, pp. 10880-10893, Oct. 2021.

Tariq et al., "CANTransfer: transfer learning based intrusion detection on a controller area network using convolutional LSTM network," In Proceedings of the 35th Annual ACM Symposium on Applied Computing (SAC '20). Association for Computing Machinery, New York, NY, USA, 1048-1055.

Tax et al., "Support Vector Data Description," Machine Learning, vol. 54, Jan. 2004, pp. 45-66.

Taylor et al, "Anomaly Detection in Automobile Control Network Data with Long Short-Term Memory Networks," 2016 IEEE International Conference on Data Science and Advanced Analytics (DSAA), Montreal, QC, Canada, 2016, pp. 130-139.

Taylor et al., "Frequency-based anomaly detection for the automotive CAN bus," 2015 World Congress on Industrial Control Systems Security (WCICSS), London, UK, 2015, pp. 45-49.

\* cited by examiner

INCOMING EDGES
04A: 264, 322
071: 04A, 115, 264, 322
115: 04A, 322
13C: 04A, 071, 264
264:
322: 13C, 264

$$\begin{array}{c} \text{EDGE END} \\ \begin{array}{c c} & \begin{array}{cccccc} \text{04A} & \text{071} & \text{115} & \text{13C} & \text{264} & \text{322} \end{array} \\ \text{EDGE START} \begin{array}{c} \text{04A} \\ \text{071} \\ \text{115} \\ \text{13C} \\ \text{264} \\ \text{322} \end{array} & \begin{bmatrix} 0 & 24 & 20 & 28 & 0 & 0 \\ 0 & 0 & 0 & 18 & 0 & 0 \\ 0 & 33 & 0 & 0 & 0 & 0 \\ 0 & 0 & 0 & 0 & 0 & 26 \\ 12 & 24 & 0 & 31 & 0 & 18 \\ 15 & 15 & 17 & 0 & 0 & 0 \end{bmatrix} \end{array} \end{array}$$

Edge matrix E

CAN ID: 254 Message Interval: 100

CAN ID: 254

1st message:     4769769 2849 463 0

200th message:  4769695 860 2511 1293

401st message:  4769753 1009 463 2311

600th message:  4769785 3220 2512 1203

*FIG. 15*

FEDERATED GRAPH NEURAL NETWORK FOR FAST ANOMALY DETECTION IN CONTROLLER AREA NETWORKS

RELATED APPLICATIONS

This application claims the benefit of provisional application Ser. No. 63/393,336 filed Jul. 29, 2022 and titled "Graph-Based Can Bus Anomaly Detection Method," the entire content of which is hereby incorporated by reference.

BACKGROUND

Controller Area Network (CAN) bus, designed by Robert Bosch GmbH in 1983, is the most popular standard for in-vehicle network communication. The CAN bus is a broadcast medium that uses a lossless bitwise arbitration method to resolve contentions during data transmissions among different Electronic Control Units (ECUs) in vehicles. Due to the lack of CAN frame encryption and authentication, a CAN bus is vulnerable to various attacks, which can in general be divided into message injection, suspension, and falsification. Existing CAN bus anomaly detection mechanisms either can only detect one or two of these attacks, or require numerous CAN messages during predictions, which can hardly realize real-time performance.

In detail, every CAN message is assigned a message identifier (CAN ID) based on its functionality and priority. A message with a lower ID will win the contention when two messages collide. In a vehicle CAN bus messages containing crucial information, such as those related to powertrain and vehicle safety, will be assigned lower CAN IDs, while infotainment and telematics messages will have higher CAN IDs.

The CAN bus protocol does not provide any authentication or encryption mechanisms. In this case, attackers have the chance to compromise the CAN bus in a vehicle through inserting forged messages. For a typical CAN ID, once forged messages overwhelm normal messages, attackers can take control of relevant operations in the targeted vehicle, which can cause severe consequences if that CAN ID is related to powertrain or vehicle safety. Furthermore, the recent development of Intelligent Transportation Systems (ITS) and Internet of Things (IoT) continuously expand the attack interfaces, which include sensors, Wi-Fi, and On-Board Diagnostics (OBD) and others. In 2021, a global automotive cyber security report based on 633 publicly reported incidents in the last decade, showing an exponential growth trend in cyber-attacks on connected vehicles.

Considering this, several Intrusion Detection Systems (IDSs) have been proposed to increase security of CAN bus. In general, if an adversary wants to make forged messages overwhelm normal ones, it can inject forged messages (DoS or fuzzy attack), suspend normal messages (suspension attack), or falsify data contents of normal messages (replay or spoofing attack). ECUs in the same CAN network usually transmit their messages with a comparatively fixed frequency, which makes the statistics of CAN message sequences comparatively stable. In this case, if the first two attack strategies happen, message frequencies or message sequences are likely to be changed, which are the motivations for existing message frequency or sequence-based detection methods. Other approaches consider message falsification attacks. They are based on the observation that message contents with the same CAN ID will not vary too much.

The situation becomes complicated when considering message injection/suspension attacks together with message falsification attacks. Message falsification attacks will not change message frequencies or sequence patterns, which will evade IDSs only considering message injection/suspension. On the other hand, IDSs for message falsification cannot identify Denial-of-Service (DoS) attacks or bus-off attacks, which do not need to change normal message contents. Recently, some related works tried to detect both of the above two kinds of attacks simultaneously based on Long Short-Term Memory (LSTM) autoencoder and bloom filtering. However, these schemes need to generate a separate model and analyze relevant messages for each CAN ID, which can induce very high computation complexity and intrusion detection delay.

BRIEF DESCRIPTION OF THE DRAWINGS

The accompanying drawings provide visual representations which will be used to describe various representative embodiments more fully and can be used by those skilled in the art to understand better the representative embodiments disclosed and their inherent advantages. In these drawings, like reference numerals identify corresponding or analogous elements.

FIGS. 14 and 15 shows relevant CAN message content in a dataset collected while a vehicle accelerates from 0 to 30 mph (about 48 km/h) and then decelerates back to 0 mph.

DETAILED DESCRIPTION

Figure 1:
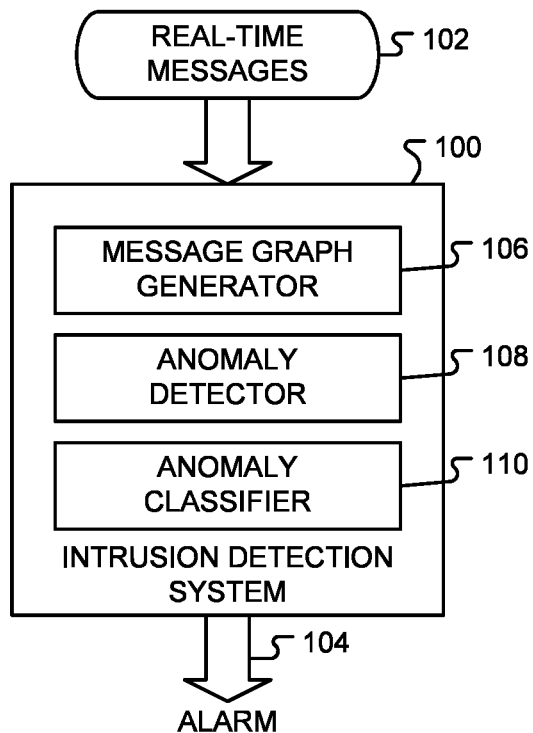
FIG. 1 is a block diagram of an intrusion detection system (IDS), in accordance with various representative embodiments.

The various apparatus and devices described herein provide mechanisms for anomaly detection in a Controller Area Network (CAN bus) or other networks where messages between nodes follow one or more patterns.

While this present disclosure is susceptible of embodiment in many different forms, there is shown in the drawings and will herein be described in detail specific embodiments, with the understanding that the embodiments shown and described herein should be considered as providing examples of the principles of the present disclosure and are not intended to limit the present disclosure to the specific embodiments shown and described. In the description below, like reference numerals are used to describe the same, similar or corresponding parts in the several views of the drawings. For simplicity and clarity of illustration, reference numerals may be repeated among the figures to indicate corresponding or analogous elements.

The disclosure relates to an intrusion detection system (IDS) that can detect and classify various attacks simultaneously in as short as three milliseconds based on Graph Neural Networks (GNNs). The disclosure is described below with reference to a CAN bus. However, the disclosed mechanisms may be applied to other networks that exhibit one or more message patterns. In various embodiments, directed attributed graphs are generated based on message streams in given message intervals. Graph node attributes denote data contents in messages while each graph edge attribute represents the frequency of a typical message pair in the given time interval. After generating the graph, a GNN is trained based on generated message graphs.

FIG. 1 is a block diagram of an intrusion detection system (IDS) 100 in accordance with various representative embodiments. IDS 100 is configured to receive a sequence of messages 102 of a communication network and generate an alarm 104 when an anomaly is detected in the sequence of messages. Each message includes data content and a message identifier. IDS 100 includes a message graph generator 106. Message graph generator 106 is configured to receive the sequence of messages 102 and generate therefrom graph data denoting a node for each message identifier in the sequence of messages and an edge for each pair of consecutive message identifiers in the sequence of messages, each edge linking two nodes. Message graph generator 106 also generates an input feature vector for each node in the graph data. The input feature vector denotes data content of messages that include the message identifier associated with the node and a pair count for each edge connected to the node. The pair count for each edge in the graph data denotes the number of times the associated pair of consecutive message identifiers occurs in the sequence of messages. IDS 100 also includes anomaly detector 108 configured to process the input feature vectors using a graph neural network (GNN) to produce first output feature vectors, and then classify the sequence of messages as containing an anomaly or not by processing the first output feature vectors through one or more first output layers. Alarm 104 is asserted when an anomaly is detected. When the communication is used in a vehicle or machine, the alarm may be used to alert the operator. The alarm may be used to initiate a mitigation process, such as entering a "safe mode" of operation.

Optionally, IDS 100 may include anomaly classifier 110 configured to process the input feature vectors using a second graph neural network, based on the same graph data, to produce second output feature vectors, and then classify the anomaly. The anomaly may be classified by processing the second output feature vectors through one or more second output layers. The classifier need only be operated when an anomaly is detected by anomaly detector 108.

Figure 2:
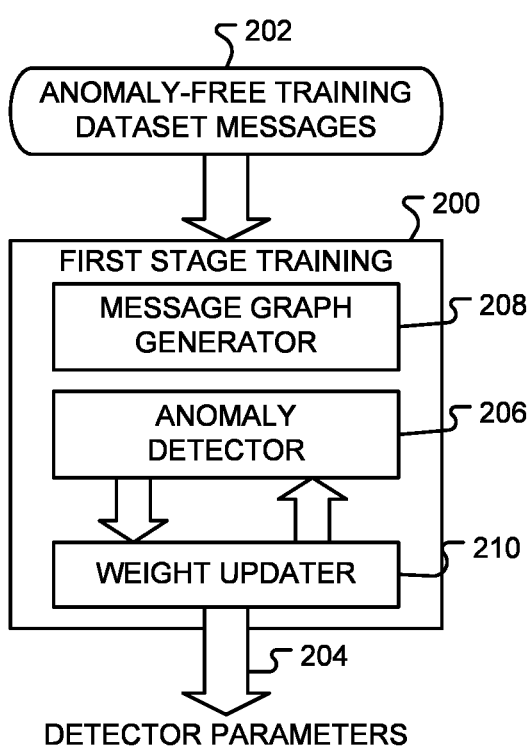
FIG. 2 shows an apparatus for training an IDS, in accordance with various representative embodiments.

FIG. 2 shows an apparatus 200 for training an IDS, in accordance with various representative embodiments. Apparatus 200 receives anomaly-free messages from one or more datasets 202 and produces weight values 204 for anomaly detector 206. Message graph generator 208 receives the messages from datasets 202 and generates graph data and input feature vectors therefrom. The weight values are used in anomaly detector 206 and updated by weight updater 210. Various techniques for updating weight values of neural networks and classifiers are known in the art.

Figure 3:
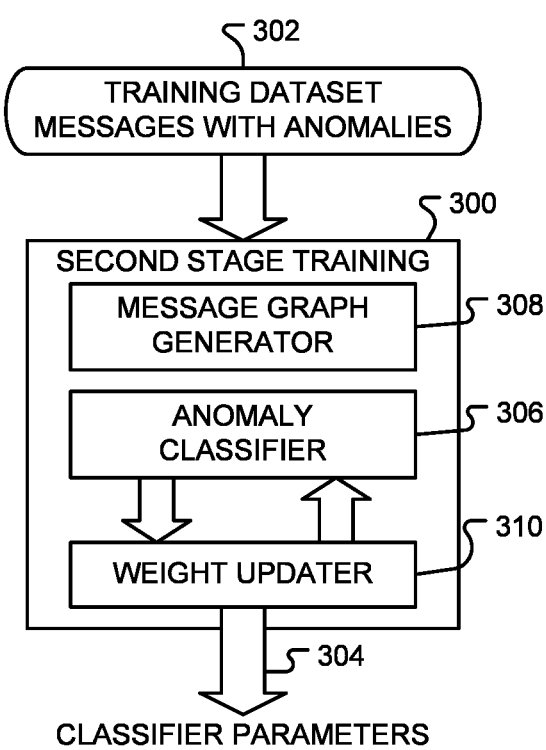
FIG. 3 shows a further apparatus for training an IDS, in accordance with various representative embodiments.

FIG. 3 shows an apparatus 300 for training an IDS, in accordance with various representative embodiments. Apparatus 300 receives messages from one or more datasets 302 and produces weight values 304 for anomaly classifier 306. At least some of the messages in datasets 302 contain known anomalies corresponding to known network intrusions. Message graph generator 308 receives the messages from datasets 302 and generates graph data and input feature vectors therefrom. The weight values are used in anomaly classifier 306 and updated by weight updater 310. Various techniques for updating weight values or neural networks and classifiers are known in the art.

Since training data may be highly imbalanced, IDS 100 uses a two-stage classifier cascade that is composed of a one-class classifier for anomaly detection and a multi-class classifier for attack classification. In one embodiment, an openmax layer is used in the multi-class classifier to tackle new anomalies from unknown classes. To take advantage of crowdsourcing while protecting user data privacy, federated learning may be used to train a universal model that covers different driving scenarios and vehicle states. Extensive experiment results show the effectiveness and efficiency of the disclosed approach.

The present disclosure relates to a CAN bus Intrusion Detection System (IDS), based on a graph neural network (GNN), which can efficiently detect message injection, suspension, and falsification attacks simultaneously. Directed attributed graphs are constructed to include both statistical CAN message sequences and message contents. Therein, message sequences are described by nodes, edges and edge attributes in graphs and summarized as the corresponding node attributes. For example, data contents in messages with a typical CAN ID may be preprocessed by the "READ" method (disclosed in M. Marchetti and D. Stabili, "READ: Reverse engineering of automotive data frames," *IEEE Trans. Inf. Forensics Secur.*, vol. 14, no. 4, pp. 1083-1097, 2018). With these generated CAN message graphs, a two-stage GNN-based classifier cascade is trained to build the disclosed IDS. Alternatively, data contents—such as signals and counters—may be extracted from message payloads using known message protocols. For example, a 64-bit payload may include four 15-bit values denoting encoded wheel speeds and a 4-bit checksum. Protocol information may be provided in a *.DBC database file or other format and stored for use by the IDS computer.

Figure 4:
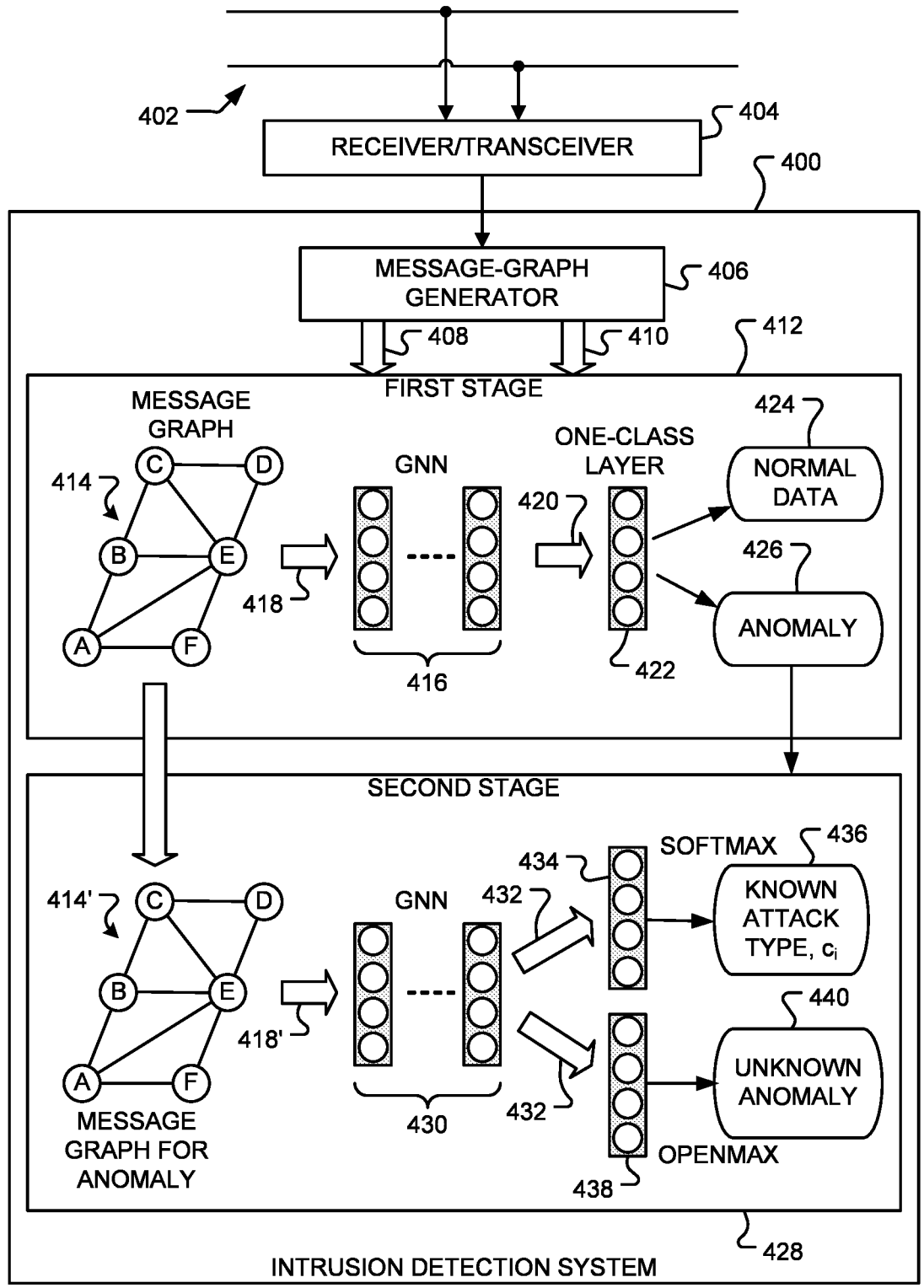
FIG. 4 shows an IDS with a two-stage GNN-based classifier cascade, in accordance with various representative embodiments.

FIG. 4 shows an IDS 400 with a two-stage GNN-based classifier cascade, in accordance with various representative embodiments. IDS 400 is coupled to communication network 402 via a receiver or transceiver 404. The use of a transceiver, or a separate receiver and transmitter enable the network to be signaled with an intrusion is detected. Messages received from communication network 402 by receiver or transceiver 404 are passed to message graph generator 406 that is configured to generate message graph data 408 and input feature vectors 410. Embodiments of message graph generator 406 are discussed in more detail below. Graph data 408 denotes the structure of graph 414, which includes a number of nodes (labeled A-F) connected by edges. Each of the input feature vectors 410 comprises attributes associated with a node of the graph and the edges connected to it.

IDS 400 includes first stage 412 that performs anomaly detection. The first stage includes a graph neural network (GNN) 416. The structure of GNN 416 is based on the graph structure 414. Input feature vectors 418 are processed by GNN 416 to produce output feature vectors 420. In turn, output feature vectors 420 are passed through a one-class classification layer 422 that determines if a sequence of messages contains normal data 424 or one or more anomalies 426. An advantage of using one-class classification layer 422 for anomaly detection is that that attacked data are usually hard to acquire in the real world, normal data usually dominate the training set, so the data may become highly imbalanced.

Once an attacked data sample is captured by first-stage detector 412, the data sample is processed by second-stage classifier 428 for attack classification. The second stage includes a graph neural network (GNN) 430. Again, the structure of GNN 430 is based on the graph structure 414' which is the same as structure 414. Input feature vectors 418' are processed by GNN 430 to produce output feature vectors 432. In turn, output feature vectors 432 are passed through a multi-class classification layer that classifies the attack. During training, the classification layer may be a softmax layer 434 that produces a multi-class classification 436. During normal operation (inference) an openmax layer 438 is used to produce a classification 440 that can include new anomalies from potentially unknown classes, which will be buffered for further investigation and open world recognition.

As discussed in more detail below, different vehicle states can lead to variations in message sequences, message contents, and further message graphs. Therefore, the model trained on one vehicle will be constrained by its limited driving scenarios (e.g., a vehicle may mostly be driven in local with low speed and a lot of stops) and vehicle states, so cannot be applied to other vehicles with different driving scenarios and vehicle states (e.g., a vehicle mostly be driven on highway at high speed and with few stops). To take advantage of crowdsourcing while protecting user data privacy, a federated learning framework may be adopted to train a universal model that covers a wide range of driving scenarios and vehicle states.

A CAN bus Intrusion Detection System (IDS) is disclosed that can efficiently detect CAN message injection/suspension and message falsification attacks at the same time. Instead of a simple combination of the above two traditional IDSs, a CAN message graph is used to integrate message contents with statistical message sequences in terms of CAN ID pairs.

Further, a graph neural network (GNN) is disclosed that can be used for directed attributed graphs. Considering that attacked data are hard to acquire in the real world, which may cause highly imbalanced training sets, a two-stage classifier cascade is used to tackle normal and attacked CAN data respectively. An openmax layer is used to cope with new anomalies from potentially unknown classes.

Still further, a federated learning mechanism is disclosed to cover different driving scenarios and vehicle states while protecting data privacy.

Performance of the proposed IDS is discussed below with reference to extensive experiments based on several real-world datasets. Through comparisons with three baselines, it is shown that the IDS can achieve similar performance to both IDSs based on statistical CAN message sequences and message contents. Besides, federated learning can effectively combine models derived under different driving scenarios and vehicle states and improve intrusion detection performance.

Attack Types

Attacks may be introduced into a network through a physical interface, such as a maintenance interface or sensor interface, or through a wireless interface, such as entertainment or information interface.

Attacks to in-vehicle networks or CAN buses may include message sniffing, message injection, message suspension and message falsification. Therein, the later three categories of attacks can further impact normal functionalities of vehicles.

Message injection attack is usually considered together with message suspension attack, since they are both related to message frequency or statistical message sequence in terms of CAN ID. In practice, message falsification attack is realized through a combination of message sniffing, message injection and message suspension.

Specific attack types include:

Denial-of-Service (DoS): This attack can also be called bus-off attack, which aims at paralyzing CAN bus systems through continuously injecting legitimate CAN messages with a low CAN ID, e.g., 0x000. Since the CAN bus uses a lossless bitwise arbitration method to tackle data transmission contention, some functionalities assigned with higher CAN IDs will never get the chance to be transmitted.

Fuzzy: This attack will generate and transmit CAN messages with random CAN IDs and data contents. The CAN IDs will range from 0x000 to 0x7FF, and some of them originally may not be used in the compromised vehicles. Such a type of attack can interfere with some functionalities of victims if extra lower CAN IDs are introduced into the systems. Besides, the randomly generated data contents can mislead vehicles if those CAN IDs are initially used.

Suspension: This is just the message suspension attack. The attacker will try to compromise some ECUs in the CAN bus system and stop them from sending any CAN messages.

Replay: This attack will try to compromise some ECUs in the CAN bus system and store some valid CAN messages in a particular time period, which will be transmitted later. Such a type of attack can mislead compromised vehicles since those stored CAN messages are actually outdated. If the attacker can further suspend those sniffed ECUs, it becomes message falsification attack.

Spoofing: Similar to replay attack, spoofing attack will at first try to sniff some ECUs in the CAN bus system. However, a spoofing attack will try to impersonate those compromised ECUs by simulating their message transmission frequencies, while the related data contents are usually forged. Message falsification attack can also be realized here by further suspending those compromised ECUs.

Intrusion Detection Systems

IDSs can be divided into anomaly detection-based and signature-based methods, which respectively identify intrusions by comparing with normal data and known attacks. Most CAN bus IDSs are anomaly detection-based methods. Message injection or suspension attacks will change CAN message frequencies or statistical message sequences in terms of CAN ID pairs, which is the basis of related works. Prior approaches directly use message frequencies for intrusion detection or data analysis methods based on statistical message sequences. Such methods compare two message sequences through statistical metrics, such as cosine similarity, Pearson correlation or chi-squared test. If a significant change in message frequencies or sequences (metric values larger than given thresholds) is detected, they predict that intrusions happen in the second message interval. Other approaches rely on machine learning based methods, such as LSTM autoencoder, to detect message injection or suspension attacks through statistical CAN message sequence reconstruction. In addition, it has been proposed to convert CAN message streams to images and train a Generative Adversarial Network (GAN) for CAN bus intrusion detection.

None of the above IDSs can properly tackle message falsification attacks. Existing works targeting message falsification attacks assume that message contents or some bits therein do not have much variance. Early works consider Hamming distance between the bit representation of each two CAN messages or message entropy for intrusion detection. For machine learning methods, they adopt techniques originally used for identifying human actions.

Recently, the development of natural language processing inspires some CAN bus IDSs based on LSTM to detect message injection/suspension attacks together with message falsification attacks. It has also been proposed to consider both CAN message frequencies and message contents through bloom filtering and ensemble learning. However, these schemes need to either consider each CAN ID separately or train multiple machine learning models. Considering each CAN ID separately will induce high data collection delay, since sufficient numbers of CAN messages are required for each CAN ID.

The disclosed IDS provides the advantages of those IDSs based on CAN message sequences, which only needs a large enough number of overall CAN messages. On the other hand, training multiple machine learning models will bring much higher computation complexity than training a single model. Furthermore, most of existing CAN bus IDSs, especially those based on LSTM, detect attacks on the basis of a trustworthy reference (a normal CAN message sequence in the previous time slot), which usually cannot be guaranteed during intrusion detection.

Preliminaries and Basics

CAN Message Format

Figure 5:
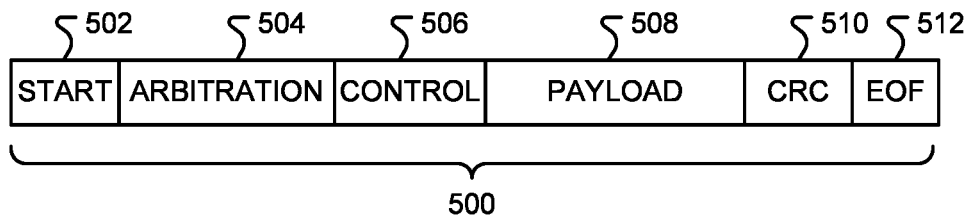
FIG. 5 shows an example CAN bus message format.

FIG. 5 shows an example CAN bus message format. CAN message 500 contains start field 502, arbitration field 504, control field 506, payload field 508, cyclic redundancy check (CRC) field 510 and end-of-file (EOF) field 512. The disclosed CAN bus intrusion detection system uses the CAN message identification (ID) code, stored in arbitration field 504, and data contents stored in payload field 508. In the CAN standard, a CAN ID has either 11 or 29 bits, and the version with 11 bits is usually selected for CAN buses in vehicles. Payload field 508 can have a length between 0 and 8 bytes (or 64 bits). Recently, an extended CAN standard has been proposed, called CAN with Flexible Data-Rate (CAN-FD). Data contents in CAN-FD messages can have a length of up to 64 bytes. However, the results presented below are based on the CAN standard with up to 8 bytes of data.

Figure 6:
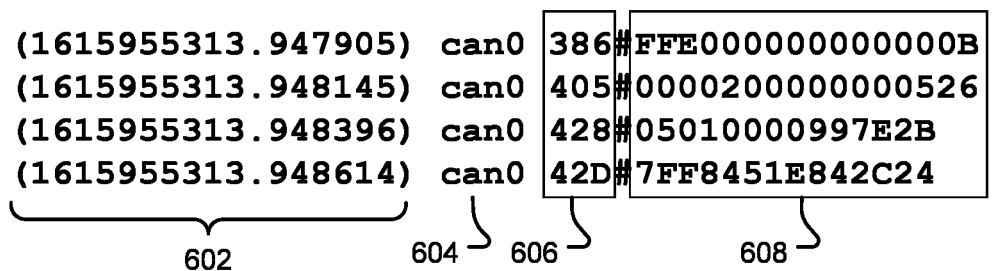
FIG. 6 shows an example sequence of CAN bus messages collected by a bus monitor.

FIG. 6 shows an example of streamed CAN bus messages collected by a bus monitor. For example, CAN bus messages can be streamed through using the candump tool in Linux CAN subsystem, a.k.a. SocketCAN. FIG. 6 shows an example with four streamed CAN bus messages with corresponding timestamps 602 and CAN interface names 604. The messages include CAN IDs 606 and data contents 608 of the four messages, denoted here with hexadecimal numerals.

In accordance with various embodiments of the disclosure, when the IDS has buffered enough previously unknown attacks or anomalies, "open world" recognition strategies are used to tackle them.

A comprehensive comparison between the disclosed IDS and existing schemes is summarized in TABLE I. References to the schemes used for comparison are provided below. A comparison of detection functionality is also listed in the table. Existing IDSs for the CAN bus system can only tell whether an attack happens or not (binary), while the disclosed IDS can also identify the specific attack type and tackle previously unknown anomalies (open multi-class).

TABLE I

| Schemes | [1]-[5] | [6] | [7]-[8] | [9]-[11] | [12]-[14] | [15] | Disclosed IDS |
|---|---|---|---|---|---|---|---|
| Message injection | yes | yes | no | no | yes | yes | yes |
| Message identification | no | no | yes | yes | yes | yes | yes |
| Collection delay | low | low | low | low | high | — | low |
| Computational complexity | — | — | — | — | — | high | low |
| Reference needed | yes | no | yes | no | yes | no | no |
| Detection functionality | binary | binary | binary | binary | binary | binary | open multi-class |

CAN Message Graph

As discussed above, CAN messages with each CAN ID are usually transmitted with a comparatively fixed frequency. It has been observed that fixed frequencies can further infer stable statistical message sequences in terms of CAN ID pairs. In addition, several engine control units (ECUs) may need to collaborate with each other to accomplish a vehicle operation task, which can be realized through transmitting successive CAN messages. For example, after one CAN message reflecting gas increase is transmitted, it is likely to be followed by a CAN message denoting an increase in revolutions per minute (rpm) of the vehicle engine and another CAN message representing vehicle acceleration. Considering these two factors, the sequences should follow comparatively fixed patterns.

With this observation, data analysis metrics, such as cosine similarity and Pearson correlation, or machine learning models, such as LSTM autoencoder, can be applied based on statistical message sequences for intrusion detection. For real-time analysis, CAN messages are considered in intervals or windows, which usually vary from 100 to 200 messages. Streaming this number of CAN messages usually takes an order of milliseconds. If the message interval is too short, e.g., less than 100 messages, the message sequence can become unstable, since messages with higher CAN IDs do not need to be transmitted very frequently and these CAN IDs may not appear in some message intervals. Message intervals may overlap.

Besides statistical message sequence, a message graph is another possible structure to describe CAN message streams. Compared with message sequences, message graphs can further embed message contents. Graph structures have both edge attributes and node attributes, and they provide the possibility to simultaneously detect all the three categories of attacks mentioned above.

Figure 7:
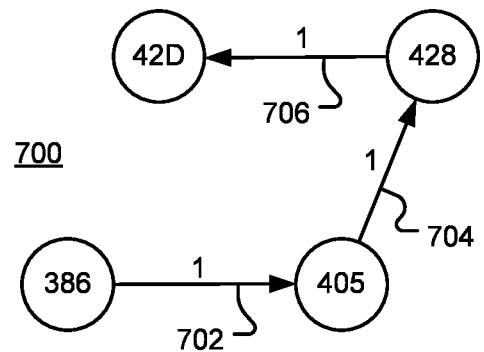
FIG. 7 shows the conversion from an example sequence of CAN message to a CAN message graph, in accordance with various representative embodiments.

FIG. 7 shows the conversion from the example CAN message shown in FIG. 6 to a CAN message graph 700. Each node in the graph represents a CAN ID appearing in the given message interval. In this example CAN message stream, a message with CAN ID 386 is followed by CAN messages with IDs 405, 428 and 42D, respectively. A node in the graph is generated for each unique ID. The corresponding graph has directed edge 702 from Node 386 to Node 405 with a pair count of 1, directed edge 704 from Node 405 to Node 428 with a pair count of 1, and directed edge 706 from Node 428 to Node 42D with a pair count of 1. The pair count corresponds to the number of times, in the message sequence, that the ID of the edge end node follows the ID of the edge start node.

Figures 8A, 8B, 8C:
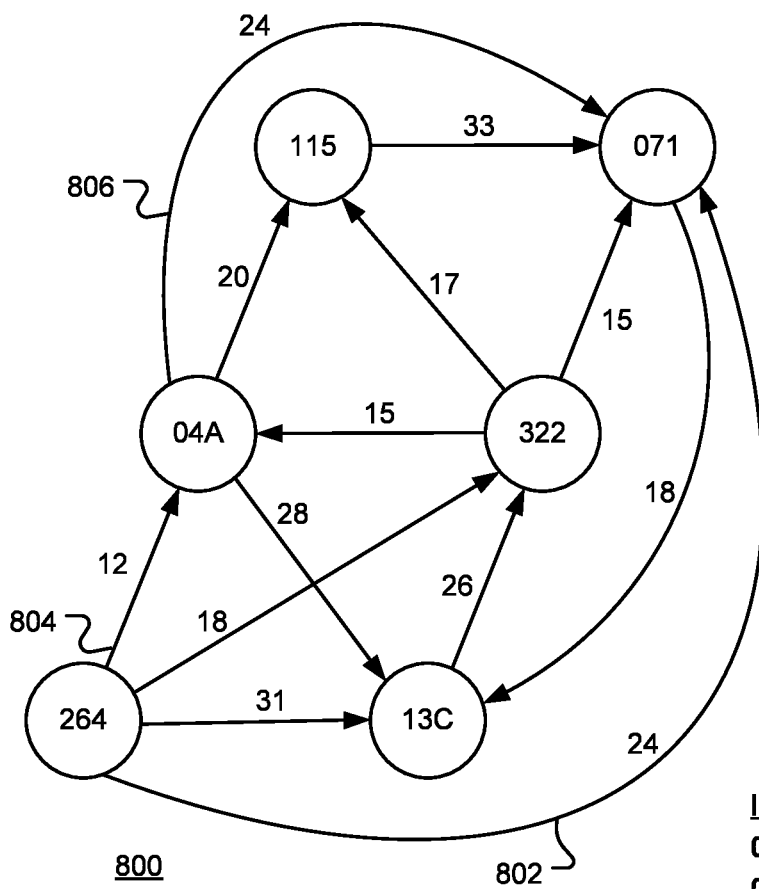
FIG. 8(a) shows a further example of a CAN message graph.
FIG. 8(b) shows an example representation of a graph structure, in accordance with various representative embodiments.
FIG. 8(c) shows an example representation of an edge matrix $E_{n \times n}$, in accordance with various representative embodiments.

FIG. 8(a) shows a further example of a CAN message graph. In each CAN message sequence, messages are considered in pairs as in FIG. 7. Edge pair counts or weights refer to the number of corresponding message pairs appearing in the given message interval. For example, edge 702 has a pair count or attribute of 24, indicating that a message with ID=264 was followed by a message with ID=071 24 times in the message sequence. The structure of a graph may be described by an adjacency matrix, denoted by $A_{n \times n}$, in which element $A_{ij}$ is equal to one if there is an edge from node i to node j, and zero otherwise. The positive integer n represents the number of nodes in the CAN message graph, which further infers the number of CAN IDs appearing in the corresponding message interval. The graph structure may also be indicated by list of nodes together with identifiers of nodes to which it is coupled by incoming edges, as shown in FIG. 8(b). The edge pair counts may be stored in an edge matrix $E_{n \times n}$, where element $E_{ij}$ denotes the pair count for the edge from node i to node j. An edge matrix for the graph in FIG. 8(a) is shown in FIG. 8(c).

Figure 9:
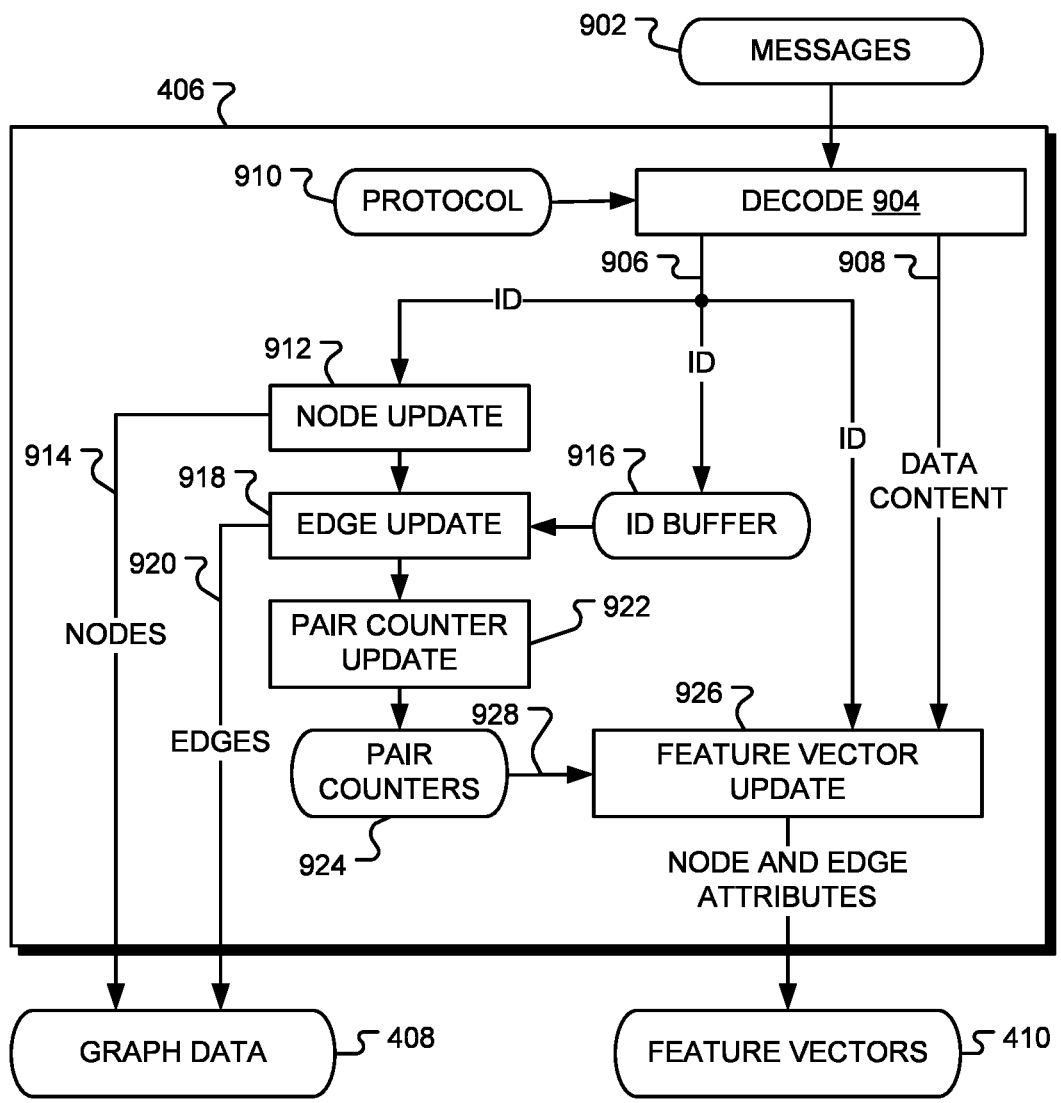
FIG. 9 is a block diagram of a message graph generator, in accordance with various representative embodiments.

FIG. 9 is a block diagram of a message graph generator 406, in accordance with various representative embodiments. Message graph generator 406 receives messages 902 and generator graph information including graph data 408 and feature vectors 410. Graph data 408 describes the structure of the graph which is defined by nodes and connecting edges. Feature vectors 410 contains node attributes—such as message data content—and edge attributes such as edge pair counts. Decode block 904 extracts message IDs 906 and data content 908 from messages 902. The data content is encoded into the payload of a message. This encoding is defined by message protocol 910. For example, several data values may be scaled to integer values and stored in designated bits of the payload. Node update block 912 receives message IDs 906 and generates a node 914 in the graph data for each unique ID. Edge update block 918 receives the current message ID 906 together with a prior message ID from ID buffer 916 and generates an edge 920 in the graph data for each new ID pair. Pair counter block 922 receives ID pairs from edge update block 918 and updates pair count in a corresponding pair counter in block 924. A pair counter counts the number of times each pair occurs in the current message sequence. Feature vector update block 926 receives message ID 906 together with corresponding data content 908 and pair counts 928 and updates feature vectors 410. The data content is an attribute of a graph node, while the pair counts are attributes of edges that begin at the graph node. The graph neural networks in the first and second stages are based on graph data 408 and receive feature vectors 410 as input.

Figure 10:
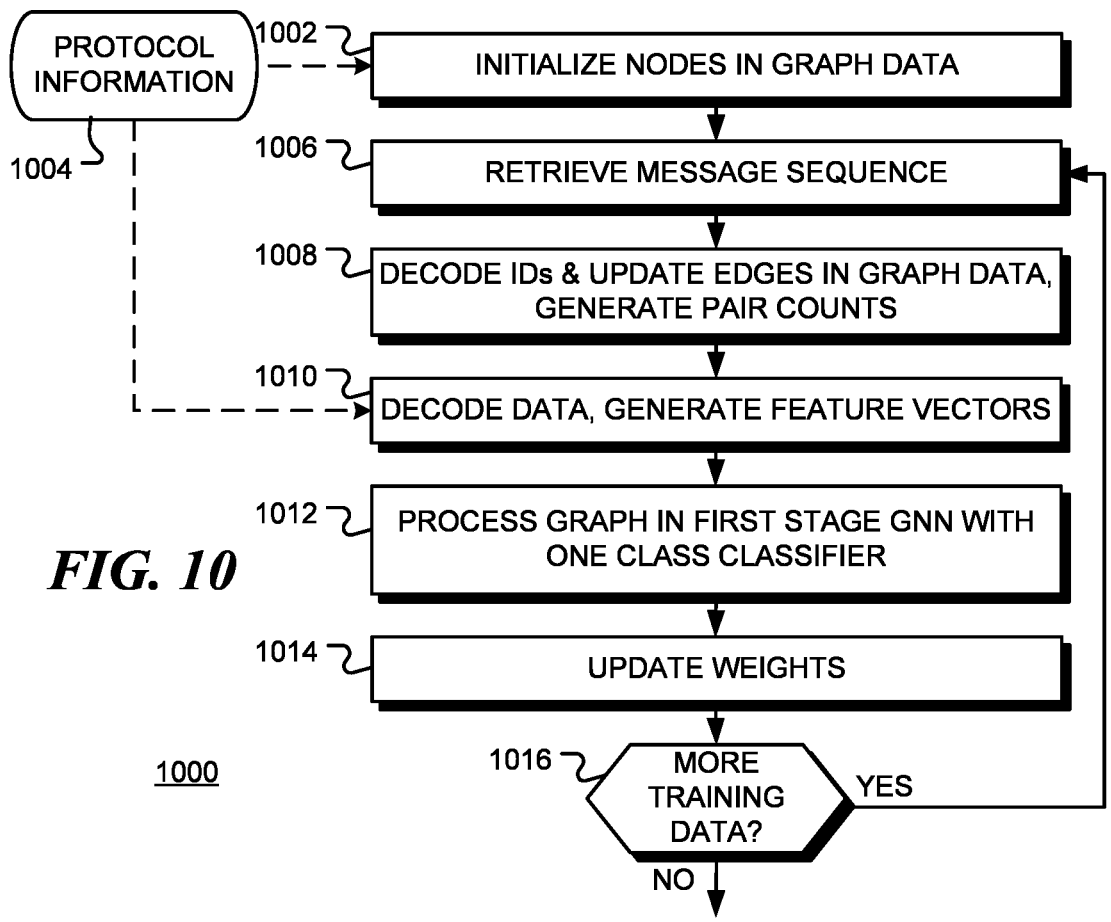
FIG. 10 is a flow chart of a method of training an anomaly detector of an IDS, in accordance with various representative embodiments.

FIG. 10 is a flow chart of a method 1000 of training an anomaly detector of an IDS, in accordance with various representative embodiments. Graph data is initialized at block 1002 by setting the nodes of the graph. These can be determined from a training dataset or from a specification 1004 of the message protocol, for example. The dataset may only contain message sequences without anomalies. At block 1006, a sequence of messages is retrieved from the training dataset. At block 1008, the message IDs are decoded from the messages and edges are generated in the graph data for consecutive pairs of message IDs. In addition, the pair counts for the edges are generated by determining how many time each pair of IDs exists in the sequence. At block 1010, the data content of the messages is determined (again using protocol information 1004). The data content and the pair counts are used to generate a feature vector for each node of the graph. The feature vectors are processed through an anomaly detector that includes a graph neural net (GNN) and one-class classifier at block 1012. Weight values of the anomaly detector are updated at block 1014. A number of techniques for neural network weight updates are known to those of skill in the art. If there are more message sequences in the training data set, as depicted by the positive branch from decision block 1016, flow returns to block 1006 and the next message sequences is retrieved. Otherwise, as depicted by the negative branch from decision block 1016, the final updated weight values are stored for later use.

Figure 11:
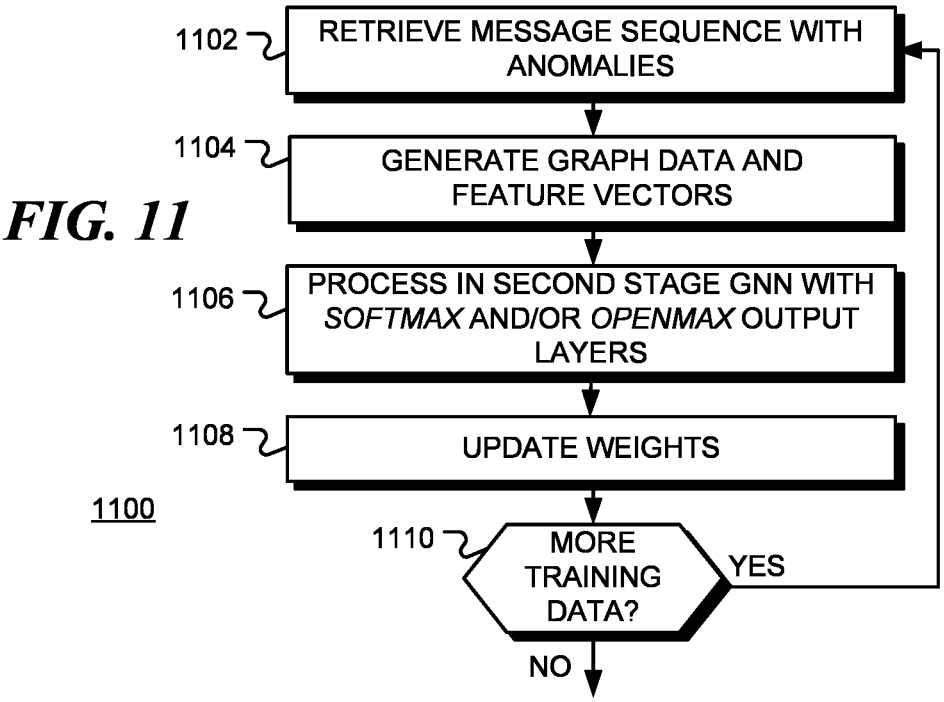
FIG. 11 is a flow chart of a method of training an anomaly classifier of an IDS, in accordance with various representative embodiments.

FIG. 11 is a flow chart of a method 1100 of training an anomaly classifier of an IDS, in accordance with various representative embodiments. At block 1102, a sequence of messages is retrieved from a training dataset. The training dataset includes anomalies corresponding to intrusion attacks. The anomaly classifier may be training using multiple different training datasets. The resulting weight values may then be combined (by averaging, for example). At block 1104, graph data and feature vectors are generated for the message sequence. At block 1106, the feature vectors are processed through a GNN with softmax and/or openmax output layers. Weight values of the anomaly detector are updated at block 1108. If there are more message sequences in the training data set, as depicted by the positive branch from decision block 1110, flow returns to block 1102 and the next message sequences is retrieved. Otherwise, as depicted by the negative branch from decision block 1110, the final updated weight values are stored for later use.

Figure 12:
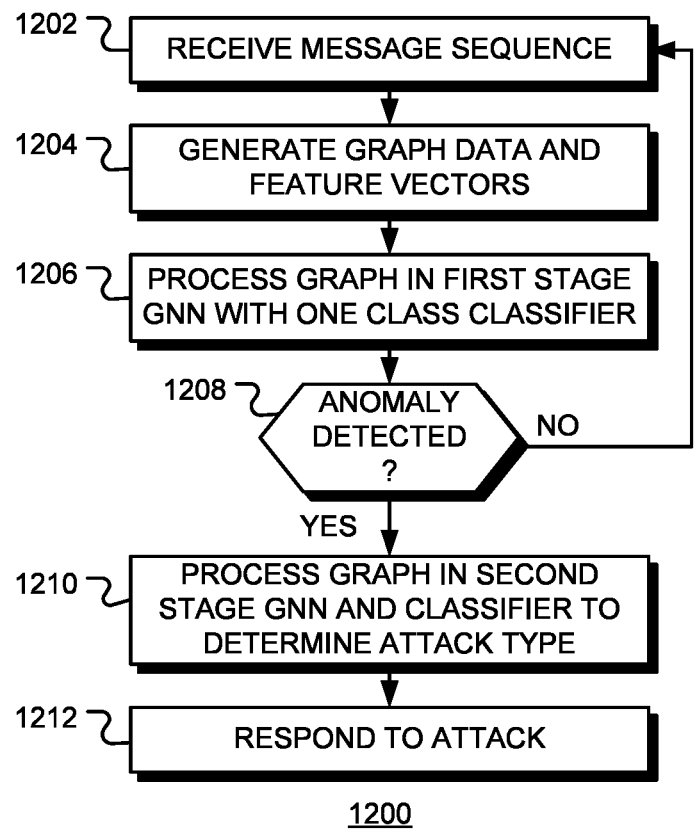
FIG. 12 is a flow chart of a computer-implement method of detecting intrusions in a communication network, in accordance with various representative embodiments.

FIG. 12 is a flow chart of a computer-implement method 1200 of detecting intrusions in a communication network, in accordance with various representative embodiments. A sequence of messages in a communication network is received at block 1202. The messages may be received directly from a local network or received from a remote network via a wireless or wired link. Each message includes data content and a message identifier. At block 1204, graph data and feature vectors are generated from the sequence of messages. The graph data denotes a node for each message identifier in the sequence of messages and an edge for each pair of consecutive message identifiers in the sequence of messages, the edge linking two nodes. For each node in the graph data the feature vector includes data content of messages that include the message identifier associated with the node and a pair count for each edge connected to the node. For edges in the graph data, the pair count indicates the number of times the associated pair of consecutive message identifiers occurs in the sequence of messages. At block 1206, the input feature vectors feature vectors through a first graph neural network (GNN), based on the graph data, and then through one-class classifier to determine whether or not the sequence of messages contains an anomaly. The one-class classifier may contain one or more output layers. When no anomaly is detected, as depicted by the negative branch from decision block 1208, flow returns to block 1202 to receive the next sequence of messages. In one embodiment, message sequences may be obtained from overlapping time windows. When an anomaly is detected, as depicted by the positive branch from decision block 1208, an alarm may be raised, or other attack mitigation actions taken. When an anomaly is detected, the type of attack may be determined, at block 1210, by processing the input feature vectors using a second graph neural network, based on the graph data, to produce second output feature vectors, and classifying the anomaly by processing the second output feature vectors through one or more second output layers. The one or more second output layers include an openmax layer and/or a softmax layer. At block 1212, the system responds to the detected attack. The nature of the response may be based on the type of attack detected.

CAN Message Content Preprocessing

As described above, the data content in each CAN message can be used for identifying message falsification attacks. In addition, proper data division may be used to improve intrusion detection accuracy. The message protocol may be known in advance. Alternatively, the protocol can be inferred (reverse engineered) from messages. For example, CAN message contents may be divided based on the rate of bit-flips. The general idea is that for each signal semantic, the most significant bit in the related data block will vary much slower than the least significant one. In this case, if a bit with a high bit-flip rate is followed by one with a low rate, these two bits probably belong to two different signal semantics or data blocks.

In order to calculate the bit-flip rate, a certain number of CAN messages are collected for each CAN ID. It is noted that the CAN message content division only needs to be conducted once based on the training set before the IDS model is trained. In this case, any data collection delay during intrusion detection is unimportant. Besides, any CAN message content associated with a new CAN ID during intrusion detection may be neglected, since it just infers a fuzzy attack.

Figure 13:
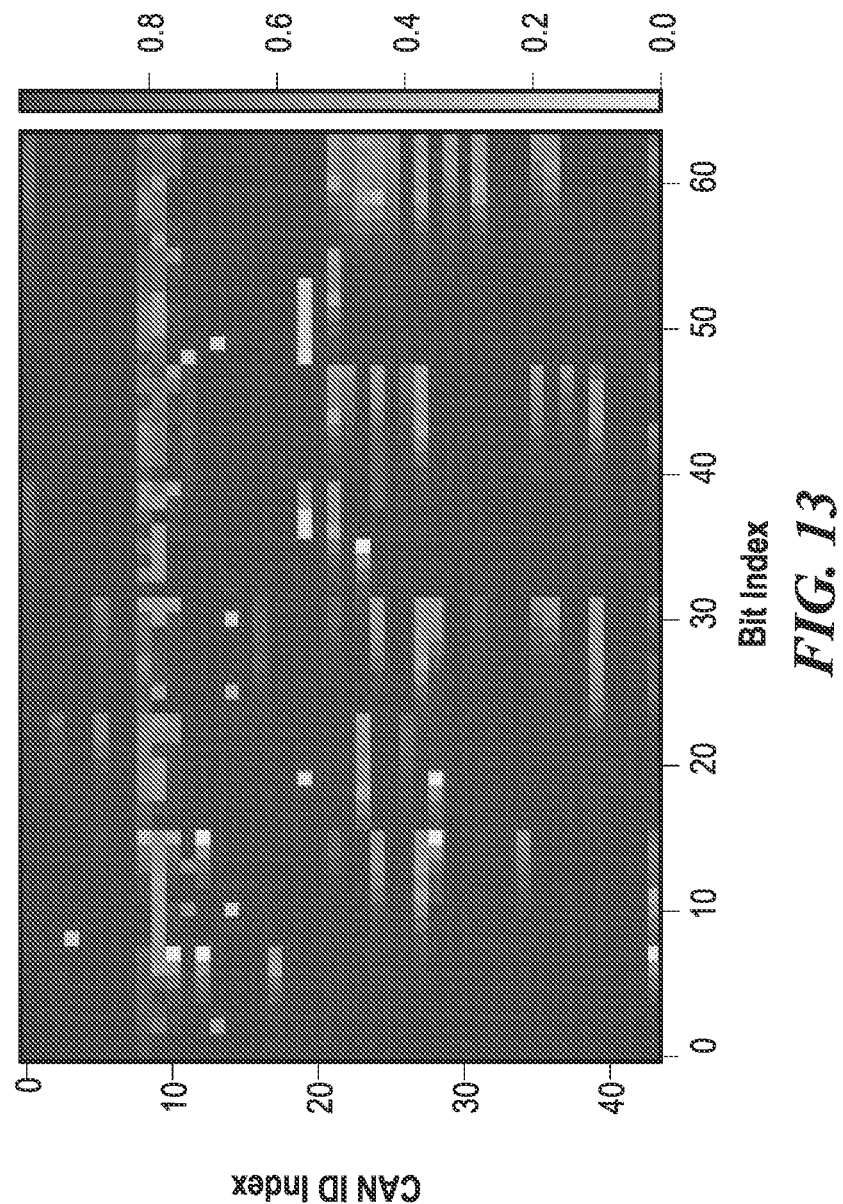
FIG. 13 shows an example bit-flip rate heatmap for identifying data content boundaries.

FIG. 13 shows an example bit-flip rate heatmap. The heatmap is composed of 44 CAN IDs and 23,963 normal CAN messages. The CAN IDs are indexed according to their values. From this heatmap, several data blocks in different CAN IDs can be seen. A signal boundary will be applied where a light pixel is followed by a dark pixel. Small variations in bit-flip rate may be ignored. In one embodiment, a magnitude array, corresponding to the decimal logarithm of bit-flip rate, is introduced and the array is examined to look for drops in this array instead.

In the descriptions below, CAN message content is described by a node matrix $V_{n \times n'}$. Message contents with different CAN IDs may be separated into different numbers of data block, each of which is further converted to a decimal number. The integer n' in the node matrix denotes the maximal number of data blocks across all CAN IDs. The number of data blocks is aligned for all CAN IDs by complementing a number of 0s in the front.

First Stage Classifier

Graph Neural Network

Graph learning has recently drawn increasing attention. All current graph learning frameworks can be divided into three levels, i.e., node level, edge level and graph level. Therein, node level algorithms can be utilized to determine whether a typical CAN message is forged or not. The disclosed CAN bus IDS is based on graph level algorithms. All three levels of models start with some graph convolution layers, and graph level schemes realize graph classification tasks via further introducing pooling and readout layers.

The convolution layer of GNN takes the following form:

$$Z = f(\tilde{D}^{-1} \overline{A} \times W). \quad (1)$$

The node matrix V is concatenated with the edge matrix E to generate a descriptor for CAN message graphs, denoted as $X_{n \times (n+n')} = [V; E]$. Data content vectors in the node matrix may be zero-padded to the maximum length. Such an operation embeds edge attributes and node attributes into a feature vector for each node. In other words, attributes of edges starting from a typical node are considered as part of attributes of that node. $\overline{A} = A + I$ represents the adjacency matrix with added self-loops, which are realized through an identity matrix I. The CAN message graphs are directed and may have self-loops, so the diagonal elements of the adjacency matrix A are set to zero before adding the identity matrix I. $\tilde{D}$ is a diagonal degree matrix with $\tilde{d}_{ii} = \sum_{j=1}^{n} \overline{a}_{ij}$, where $\tilde{d}_{ii}$ and $\overline{a}_{ij}$ are respectively elements in $\tilde{D}$ and $\overline{A}$ with the corresponding indices. $W \in \mathbb{R}^{(n+n') \times c}$ denote model parameters in a 1×1×c convolution layer, where c is the number of feature channels in the convolution layer. $f(\bullet)$ is a pointwise nonlinear activation function, such as Rectified Linear Unit (ReLU).

The whole graph convolution process can be explained as follows. Node and edge attributes are at first fitted into the convolution layer through a linear feature transformation XW. Afterwards, for each node, its "channel descriptor," denoted by rows of the matrix Y=XW, is propagated to its neighborhood, including itself, through $\overline{A}Y$. Hence the adjacency matrix $\overline{A} = A + I$ includes self-loops. The propagation results are then normalized by multiplying them with the inverse diagonal degree matrix, $\tilde{D}^{-1}$, which aims at keeping a fixed feature scale after graph convolution. Finally, a pointwise nonlinear activation function $f(\bullet)$ is applied before outputting the graph convolution results.

Similar to convolution neural networks applied in image processing, in order to capture graph substructure features in different scales, Multiple convolution layers are applied and stacked. In this case, in the $t^{th}$ convolution layer:

$$Z_t = f(\tilde{D}^{-1} \overline{A} Z_{t-1} W_t). \quad (2)$$

Here, $Z_{t-1}$ and $Z_t$ respectively represent the input and output matrix of the $t^{th}$ convolution layer, and $Z_0=X$. $W_t \in \mathbb{R}^{c_{t-1} \times c_t}$ includes model parameters in the $t^{th}$ convolution layer, with $c_0=n+n'$. After acquiring all $Z_t$ from those convolution layers, the outputs are stacked through concatenation to give the matrix $Z_{1:\tau}=[Z_1, Z_2, \ldots, Z_\tau]$.

This completes the design of the graph convolution layers. For graph classification tasks, pooling and readout layers are used. Besides pooling layers for down-sampling, a sorting operation may be used to sort nodes in the message graph according to their structural roles. This facilitates fitting similar graphs into readout layers in a comparatively consistent node order. As will be discussed below, vehicle states can sometimes cause variations in CAN message graphs, since some ECUs in vehicles are not always activated in order to prolong battery life. Such a situation can further induce node indexing issues, which can be solved by this sorting operation. The readout layers are usually composed of one or more 1-Dimensional (1-D) convolution layers and dense layers.

One-Class Classification

Traditionally, the last layer of a neural network is a sigmoid or softmax layer for classification tasks. The softmax function converts a vector of K real numbers into a probability distribution of K possible outcomes. Intrusions to CAN buses are hard to acquire in real vehicles so, unless simulated data is used, a training set may be highly imbalanced. To avoid imbalance, the first-stage classifier is designed as an anomaly detection-based IDS in which the conventional sigmoid or softmax layer is replaced with a one-class classification layer. This enables the model to be trained using only "normal" CAN bus data.

One-class classification is widely used for anomaly detection and can train a classifier only by using normal data. Known approaches include One-Class Support Vector Machine (OC-SVM) and Support Vector Data Description (SVDD). Compared with OC-SVM, SVDD has better computation scalability and better performance in tackling high dimensionality. Either approach may be used with a GNN for intrusion detection.

Similar to OC-SVM, SVDD comes from the traditional Support Vector Machine (SVM). However, instead of using a hyperplane to define the soft classification border, SVDD tries to find a hypersphere with a center $o \in \mathbb{R}^{c_g}$ and a radius $r>0$ as the border. Here, $c_g$ represents the output dimensionality of the last dense layer in our GNN. In general, the related optimization problem of SVDD can be defined as follows:

$$\operatorname*{argmin}_{r,o,\xi} r^2 + \frac{1}{vm}\sum_{k=1}^{m} \xi_k, \quad (3a)$$

subject to $$\forall k, \|\varnothing_{c_g}(X_k)-o\|^2 \leq r^2+\xi_k, \xi_k \geq 0 \quad (3b)$$

In equation (3a), $\xi$ is called a slack vector, in which all slack variables $\xi_k \geq 0$ together construct a soft classification border or hypersphere. The soft classification border allows some of data samples or support vectors originally from one class to cross the borderline and fall in another class, which helps to avoid model overfitting via reducing the radius of the hypersphere to a certain extent. On the other hand, the hypersphere cannot be shrunk without any limitation since this can potentially induce model underfitting. In this case, a weight $v \in (0, 1]$ is introduced to balance model overfitting and underfitting. In Equation (3b), the function $\varphi c_g(x_k)$ is the kernel function usually used in SVM for space mapping.

Here, the whole architecture of GNN except the last one-class classification layer is considered to be the kernel function. $X_k$ refers to the $k^{th}$ CAN message graph in the training set. $\|\cdot\|$ is the $L^2$ norm.

The constraint of the above optimization problem can be embedded into its objective function. The $k^{th}$ element of the slack vector, $\xi_k$, is initialized as:

$$\xi_k = \max\{0, \|\varnothing_{c_g}(X_k)-o\|^2-r^2\}. \quad (4)$$

$\xi_k$ in equation (3a) is then replaced with equation (4). In addition, a model parameter regularization term is introduced to further avoid model overfitting. This provides the following optimization problem without any constraint, which can be seen as the loss function of the whole GNN model of the present disclosure:

$$\xi_k = \operatorname*{argmin}_{r,W_{all}} r^2 + \frac{1}{vm}\sum_{k=1}^{m} \max\{0, \|\varnothing_{c_g}(X_k)-o\|^2-r^2\} + \frac{\lambda}{2}\|W_{all}\|^2. \quad (5)$$

Here, $\lambda$ is the weight decay to balance the penalty for large model parameters. $W_{all}$ denotes a vector which includes all the parameters in the GNN model except the last one-class layer. The center of the hypersphere o is considered to be fixed and is not considered as a coefficient to be tuned. Some data samples are at first chosen from the training set. Afterwards, these data samples are passed through the initialized whole GNN except the last one-class classification layer, and the outputs from the last dense layer are recorded. Finally, the center o is set to the mean of these outputs. Note that the above loss function considers all of the CAN message graphs in the training set at the same time. If gradient descent is used for model parameter update, CAN message graphs for training may be considered in batches. To minimize computation complexity, the training process may be based on mini-batch Stochastic Gradient Descent (SGD).

Second-Stage Classifier

After the first-stage classifier filters out all the anomalies, the message graphs with anomalies are sent to the second-stage classifier to detect the specific attack type. The second-stage classifier can be seen as a signature-based IDS. In order to tackle the potential new anomalies from unknown classes, such as zero-day attacks, the second-stage classifier further introduces an openmax layer.

During the training process, the second-stage classifier still utilizes the traditional softmax function in the output layer. The openmax layer is deployed during intrusion detection to replace the softmax layer, which revises the output of the penultimate layer in the original classifier to reject data samples not close enough to any known class. The output of the penultimate layer can be denoted as an activation vector $A_{C \times 1}$, where C represents the number of known types of attacks. The design of the openmax layer may be based on meta-recognition algorithms, in which the distribution of the activation vector is analyzed through Extreme Value Theory (EVT), and the Weibull distribution is determined. In detail, the EVT fitting in the openmax layer design adapts the concepts of Nearest Class Mean or Nearest Non-Outlier per attack type to the activation vector. Each attack type $c_i$ is represented with a mean activation vector (MAV), which is derived through averaging all the activation vectors of the training samples belong to this attack type, denoted as $\bar{A}_{c_i}$. Then, within each attack type, the Euclidean distance between the activation vector of each training sample $\mathcal{A}_{c_i,j}$ and the MAV $\bar{\mathcal{A}}_{c_i}$ is calculated. Afterwards, Weibull fitting is performed for each attack type based on EVT:

$$\|\mathcal{A}_{c_i,j} - \bar{\mathcal{A}}_{c_i}\|^2 \sim \text{Weibull}(\alpha_i, \beta_i, \gamma_i), \tag{6}$$

where $\alpha_i$, $\beta_i$ and $\gamma_i$ respectively denote the shape, scale and position parameter to describe a Weibull distribution. $\gamma_i$ has the same dimensionality as $\bar{\mathcal{A}}_{c_i}$ for shifting the data. The Weibull fitting is pre-computed at the end of the training process.

When a new anomaly CAN message graph comes to the second-stage classifier, the openmax layer will follow METHOD 1, listed below, for attack type classification with potential unknown anomaly rejection. From METHOD 1, it can be seen that the openmax layer in general adapts the softmax function to open world recognition, which is realized by introducing an extra class $c_0$ (line 8 of METHOD 1). Such a class is used to include all the anomaly CAN message graphs that are not quite similar to any existing attack type, and further infer a potential unknown class. Line 4 of METHOD 1 generates probabilities in which the new anomaly CAN message graph belongs to a selected number of top-ranked classes or attack types. Such probabilities are derived from the corresponding fitted Weibull distributions and used to revise the activation vector (line 5 of METHOD 1).

Method 1: Openmax Attack Type Classification with Potential Unknown Rejection.

---

Inputs:
$\mathcal{A}(X) = [a_1, a_2, \ldots, a_C]^T$: activation vector of the new anomaly CAN message graph X.
$\bar{\mathcal{A}}_{c_i}$: MAV representing the known attack type $c_i$.
$\{\alpha_i, \beta_i, \gamma_i\}$: parameter set describing the fitted Weibull distribution related to the known attack type $c_i$.
$\kappa$: number of "top" classes to revise.
Output: $c^*$: attack type, unknown class if $c^* = c_0$ or probability $P(c = c^*|X) < \varepsilon$
1. Initialize $S = [s_1, s_2, \ldots, s_C] \leftarrow 0$, $\omega = [\omega_1, \omega_2, \ldots, \omega_C] \leftarrow 1$
2. $S \leftarrow \text{argsort}(\mathcal{A}(X))$
3. for $i = 1, 2, \ldots, \kappa$ do 4. $\left\lfloor \omega_{s_i} \leftarrow 1 - \frac{\kappa - i}{\kappa} e^{-\left(\frac{\|\mathcal{A}(X) - \bar{\mathcal{A}}_{s_i} - \gamma_{s_i}\|_2}{\beta_{s_i}}\right)^{\alpha_{s_i}}} \right.$ 5. $\mathcal{A}(X) \leftarrow \mathcal{A}(X) \circ \omega [r]$ // Element-wise product.
6. $a_0 \leftarrow \sum_{i=1}^{C} a_i(1 - \omega_i)$
7. for $i = 0, 1, \ldots, C$ do 8. $\left\lfloor P(c = c_i | X) = \frac{e^{a_i}}{\sum_{j=0}^{C} e^{a_j}} \right.$ 9. $c^* = \arg\max_c P(c = c_i | X)$

---

Federated Graph Neural Network Learning
Vehicle State and CAN Message Relationship Previous works assume that CAN bus intrusions can change statistical message sequences and message contents. In fact, changes of vehicle states can also cause CAN message variations but in a reasonable way. Intuitively, CAN message contents will change to reflect different vehicle states. On the other hand, vehicle states can also affect CAN message sequences since some ECUs may not get activated all the time to prolong battery life in vehicles. For example, tire pressure sensors will sleep most of the time and wake up only when vehicles start to travel at high speeds (over 40 km/h), or during diagnosis and the initial CAN ID binding phases.

The above claims can be validated using datasets without any attacks. FIGS. 14 and 15 shows relevant CAN message content in a dataset collected while a vehicle accelerates from 0 to 30 mph (about 48 km/h) and then decelerates back to 0 mph. The target CAN ID is 254, which is related to vehicle speed information, and the dataset has 707 messages with this CAN ID. Message contents are preprocessed based on READ. FIG. 14 shows all relevant CAN messages within a 100-message long interval, which includes the 1st CAN message, while FIG. 15 lists the data content of the 1st, 200th, 401st and 600th message. In a single message interval, the vehicle is considered to be in a constant state, while two CAN messages from two different intervals may correspond to two different vehicle states. From FIG. 15, an obvious value changes in the second and fourth data block can be seen, which are not reflected in FIG. 14. Besides, the fourth data block seems to be related to the vehicle speed, which makes its value vary within a certain range considering the vehicle speed limit. In other words, message content changes with CAN ID 254 should have the above two features or be reasonable. Note that the value of the third data block actually jumps between around 463 (odd indices) and around 2511 (even indices), which is not considered as a change here.

Figure 16:
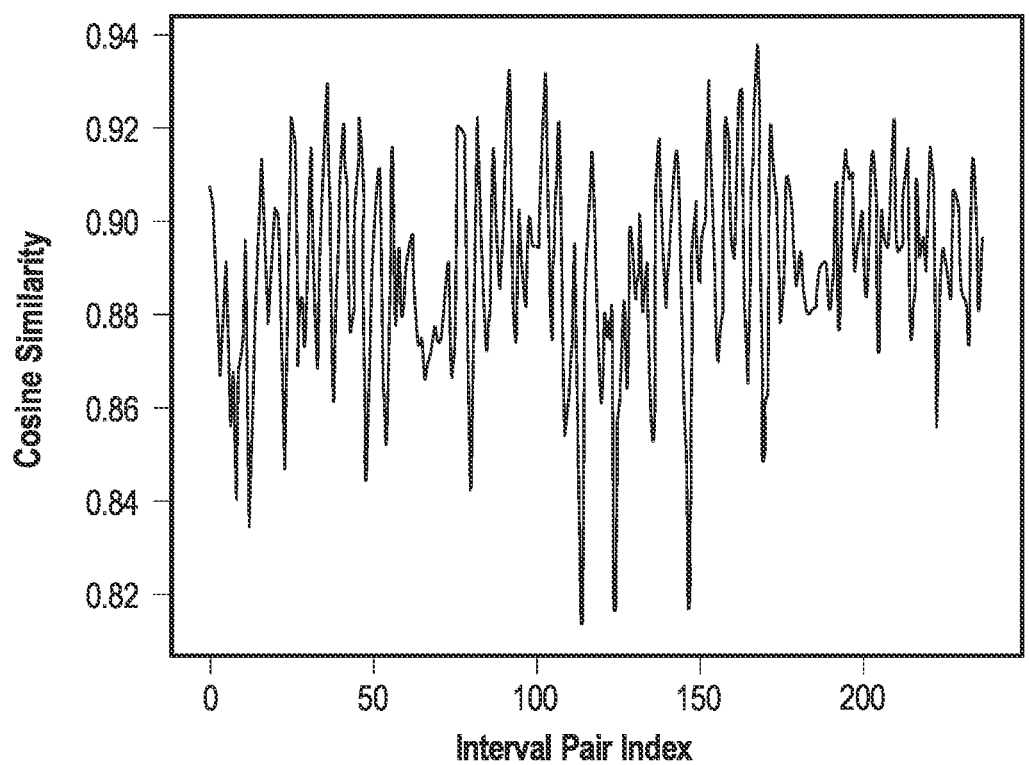
FIGS. 16 and 17 show examples of how vehicle states can affect CAN message sequences.
Figure 17:
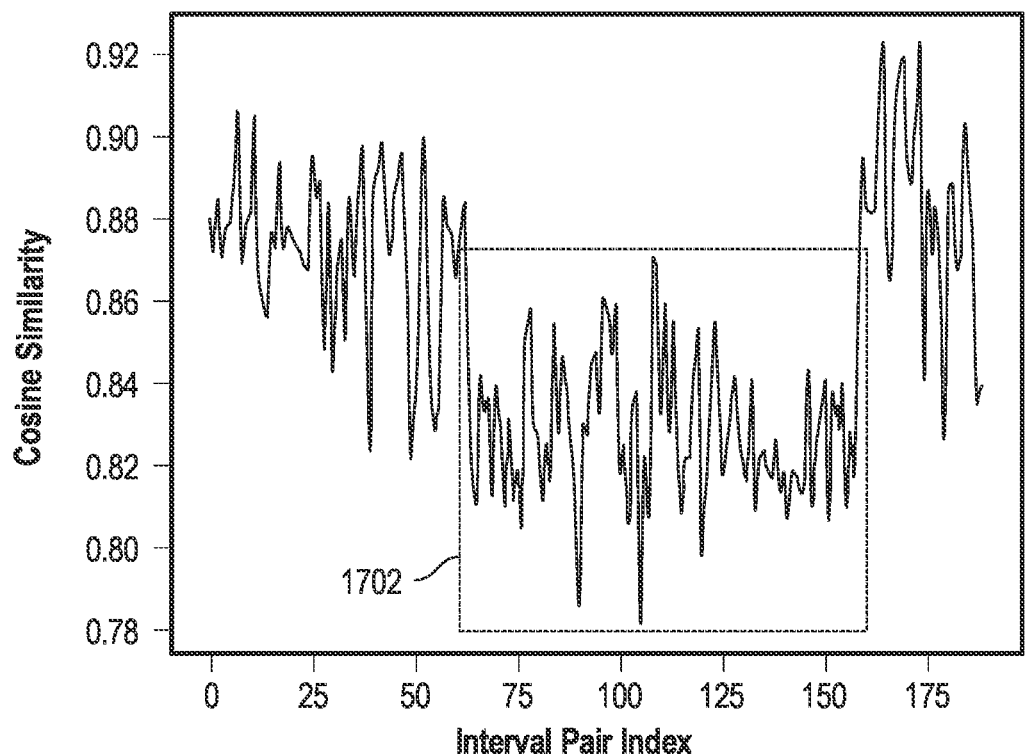

FIGS. 16 and 17 show examples of how vehicle states can affect CAN message sequences. In this example, a dataset with 23,963 CAN messages is split into 239 message intervals with each having 100 messages. For each message interval, the number of times for each possible CAN ID pair appears is counted and the corresponding statistical message sequence is generated. First, all CAN message ID pairs in the dataset are recorded, then the two message sequences are compared based on cosine similarity. FIGS. 16 and 17 show comparison results under two situations. In the first scenario, any two consecutive CAN message sequences are compared. In detail, cosine similarity between 1st and 2nd message sequence is indexed in 1st interval pair, cosine similarity between 2nd and 3rd message sequence is indexed in 2nd interval pair, and so on. In the second scenario any two CAN message sequences with 50 message intervals apart are compared. Cosine similarity between 1st and 51st message sequence is indexed in 1st interval pair, cosine similarity between 2nd and 52nd message sequence is indexed in 2nd interval pair, and so on.

Based on the above two comparisons, a step change can be seen when two message sequences are 50 intervals apart, which cannot be observed in the first situation. In a short time-interval, i.e., when two consecutive message sequences are compared, the vehicle state does not change. In this case, message sequences vary within a certain range, which is reflected in FIG. 16. On the other hand, two message sequences with 50 intervals apart will correspond to two different vehicle states. Since some ECUs, such as tire pressure sensors, will only get activated in some vehicle states, noticeable variations, such as the step change indicated by box 1702 in FIG. 17, can happen. In addition, message sequence changes may further have intrinsic connections with some message content variations caused by vehicle state changes. Thus, it is desirable to collect data from as many driving scenarios and vehicle states as possible, which may have to come from different vehicles considering the limitations discussed above. Federated learning can then be applied for model training while protecting data privacy.

Federated Learning

Federated learning is a type of distributed machine learning. For example, a cloud server may collaborate with several local users for model training. The whole training set in federated learning is actually composed of those local datasets owned by each local device, which are non-Independent and Identically Distributed (non-IID). During model training, each local device will train a local model based on its own dataset, and only upload model parameters to the cloud server for aggregation, through which data privacy can get protected. In the present application, the non-IID property can be caused by different driving scenarios or vehicle states. In order to improve intrusion detection performance of the disclosed IDS, a federated learning environment may be used. Vehicles in different status can train the disclosed GNN model based on their own CAN bus data, and then upload model parameters to the cloud server for model aggregation.

By way of example, two federated learning schemes, referred to as "FedAvg" and "FedProx," are evaluated below. Both schemes are based on mini-batch SGD to update local parameters. The whole training process can be divided into a certain number of communication rounds between a cloud server and vehicles. In each communication round, some of the vehicles are selected to upload their model parameters to the cloud server for aggregation after local iterations. In the $l^{th}$ selected vehicle, some generated CAN message graphs are selected at each local iteration. During the training of the first-stage classifier, for each selected message graph $X_k$, the corresponding loss is derived based on the loss function defined in Equation 5 and current local model parameters in the $l^{th}$ vehicle, denoted as $f(r_l, W_{all,l}, X_k)$. Under mini-batch SGD, the mini-batch loss of the $l^{th}$ selected vehicle can be calculated by averaging losses across all selected message graphs:

$$F(r_l, W_{all,l}) = \frac{1}{m_l} \sum_{k \in P_l} f(r_l, W_{all,l}, X_k), \quad (7)$$

where $P_l$ is the set of selected message graphs in the $l^{th}$ vehicle at each local iteration, and ml denotes the total number of elements in $P_l$.

When it comes to local model parameter update in the $l^{th}$ vehicle, the mini-batch gradient $G_\tau(r_l, W_{all,l})$ at each local iteration τ can be derived by computing partial derivatives of $F(r_l, W_{all,l})$ on each model parameter. Then, model parameters in the $l^{th}$ vehicle are updated as follows:

$$[r_l, W_{all,l}]_{\tau+1} \leftarrow [r_l, W_{all,l}]_\tau - \eta G_\tau(r_l, W_{all,l}) \quad (8)$$

Here, $[r_l, W_{all,l}]_\tau$ is used to denote a vector which includes variations, such as the above CAN ID 254 related to vehicle speed. In order to differentiate CAN message all parameters in the disclosed one-class GNN model. η represents the learning rate. After a given number of iterations, all the L selected vehicles upload their learned model parameters to the cloud server for aggregation:

$$[r, W_{all}] = \frac{1}{m} \sum_{l=1}^{L} m_l [r_l, W_{all,l}]. \quad (9)$$

The result is considered as the globally learned model parameters after each communication round. Finally, [r, $W_{all}$] is broadcast to all vehicles for the following possible local iterations.

The above model parameter update is generally based on "FedAvg," which will not necessarily provide convergence guarantee. "FedProx" improves convergence performance by further introducing a proximal term. Such a term can ensure that updated local model parameters will not drift away from the global model parameters derived in the last communication round. Mathematically, the mini-batch loss function of the $i^{th}$ vehicle can be modified to:

$$F(r_l, W_{all,l}) \leftarrow F(r_l, W_{all,l}) + \frac{\mu}{2} \left\| [r_l, W_{all,l}] - [r, W_{all}]_{pre} \right\|^2. \quad (10)$$

Here, $[r, W_{all}]_{pre}$ is used to represent the global model parameters derived in the previous communication round. μ is a hyperparameter to balance the effect of the proximal term. The training of the second-stage classifier follows a similar process except that the traditional softmax and cross-entropy function are respectively used as the output layer and loss function. In addition, the deployment of the openmax layer needs the Weibull fitting, which is conducted at the end of model training. In the federated learning scenario, the cloud server at first requests vehicles to upload the activation vectors of anomaly CAN message graphs and the corresponding labels in their training sets. Afterwards, the Weibull fitting is conducted in the cloud server. Since only the activation vectors instead of raw data need to be uploaded, the privacy guarantee of federated learning is not violated. Besides, the Weibull fitting only needs one single communication round between the cloud server and vehicles, which will not induce much extra communication overhead.

Experimental Results

Datasets and Experiment Setup

In this section, experiments conducted to evaluate our GNN-based IDS under CAN message injection attacks, message suspension attacks and message falsification attacks are described. In particular, for the first-stage classifier, the disclosed IDS is compared with three baselines on anomaly detection, which respectively represent IDSs considering statistical CAN message sequences and message contents. For the second-stage classifier, performance is evaluated for classifying specific attack types and identifying new anomalies from unknown classes.

In the first baseline, described by M. Jedh, L. ben Othmane, N. Ahmed, and B. Bhargava, in "Detection of message injection attacks onto the CAN bus using similarity of successive messages-sequence graphs," arXiv: 2104.03763., 2021, develops three kinds of strategies to detect CAN bus intrusions via message sequences, i.e., thresholds for cosine similarity, Pearson correlation and LSTM. Data for evaluation are collected on a Ford Transit 500, which are separated into three sets. The first dataset is composed of 23,963 normal CAN messages, while message injection attacks are considered in the remaining two datasets. In the second and third dataset, CAN IDs related to vehicle speed and rpm (254 and 115) are respectively targeted, and compromised CAN messages are randomly injected into these two datasets after given time spots. In total, the second and third dataset each have 88,492 and CAN messages. The second baseline is described by A. Taylor, S. Leblanc, and N. Japkowicz, "Anomaly detection in auto-mobile control network data with long short-term memory networks," in *Proc. IEEE Int. Conf. Data Science and Advanced Analytics*, 2016, pp. 130-139. The third baseline is described by H. Sun et al., in "Anomaly detection for in-vehicle network using CNN-LSTM with attention mechanism," *IEEE Trans. Veh. Tech-*

*nol.*, vol. 70, no. 10, pp. 10 880-10 893, 2021. Both the second and third baselines use IDSs based on message contents and LSTM. The evaluation dataset is CAN Signal Extraction and Translation Dataset provided by Hacking and Countermeasure Research Lab. To facilitate comparisons, anomaly data with the five attack types—DoS, fuzzy, suspension, replay, and spoofing attack—is generated.

The graph neural network (GNN) model used in the examples below at first has four graph convolution layers, with the last layer having only one feature channel for the convenience of node sorting, which is realized in a SortPooling layer. The SortPooling layer is followed by two 1-D convolution layers, one MaxPooling layer, one dense layer and one dropout layer. A Support Vector Data Description (SVDD) classifier is used for the first-stage classifier, while an openmax layer is used in the second-stage classifier. During the GNN model training, a large number of hyperparameters can be tuned. The results below focus on the number of feature channels in the first three graph convolution layers. different settings are evaluated for two hyperparameters in the SVDD classifier, i.e., v and λ. In addition, the hyperparameter p in FedProx will also be explored. In detail, the output of the SortPooling layer is set to a $k_s \times \Sigma_{t=1}^{4} c_t$ tensor, where $k_s$ is set to a value that is not larger than the number of nodes in 60% of CAN message graphs in the training set. The first 1-D convolution layer has 16 feature channels followed by a MaxPooling layer with a filter size 2 and step size 2. The second 1-D convolution layer has 32 feature channels, a filter size 5 and step size 1. The dense layer has 128 hidden neurons, followed by a dropout layer with a 0.5 drop rate. For activation functions, hyperbolic tangent function (tanh) is selected in graph convolution layers, and ReLU in all the other necessary layers. Mini-batch SGD is optimized as described by D. P. Kingma and J. L. Ba in "Adam: A method for stochastic optimization," arXiv: 1412.6980, 2014.

Statistical CAN Message Sequences

In this subsection, training performance is evaluated under different GNN model settings to select the best setting based on experimental results. In detail, the number of feature channels in graph convolution layers is selected from {32, 64, 128}, v is selected from {0.001, 0.01, 0.1} and λ is selected from {$10^{-4}$, $10^{-5}$, $10^{-6}$}. The first dataset in the first baseline, which only contains normal CAN messages, is used as the training set. The message interval is chosen to be 100 CAN messages. The size of a mini-batch is 10. Each setting is based on a 10-fold cross validation, which is further run for 10 times.

Figure 18:
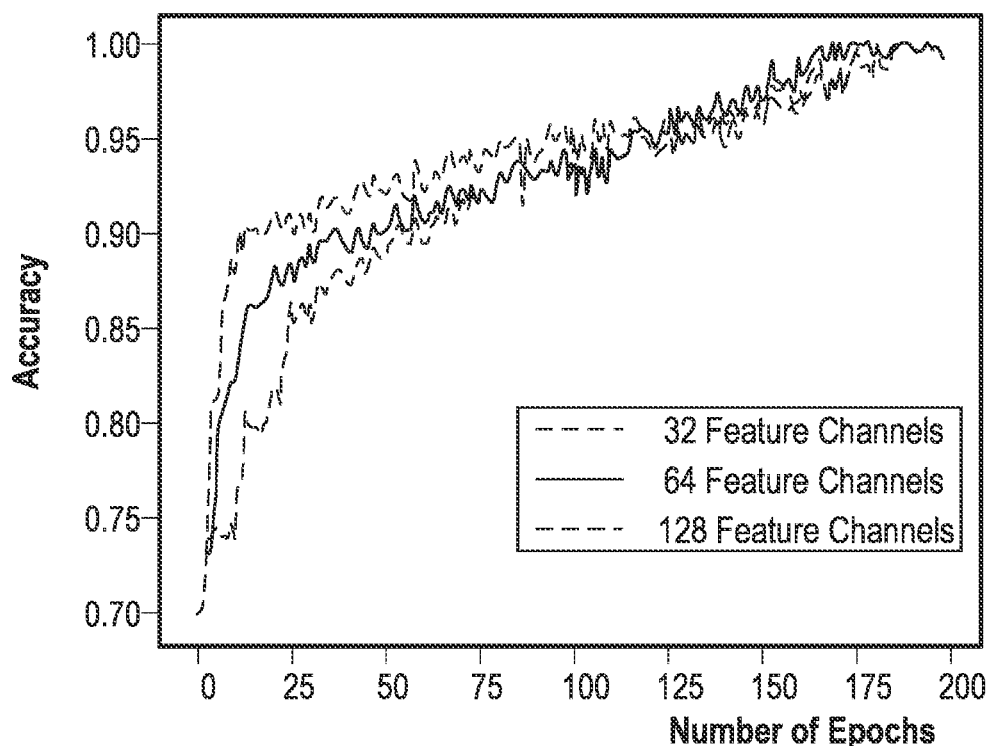
FIGS. 18-20 show the averaged accuracy curves under different IDS hyperparameter settings, in accordance with various representative embodiments.
Figure 19:
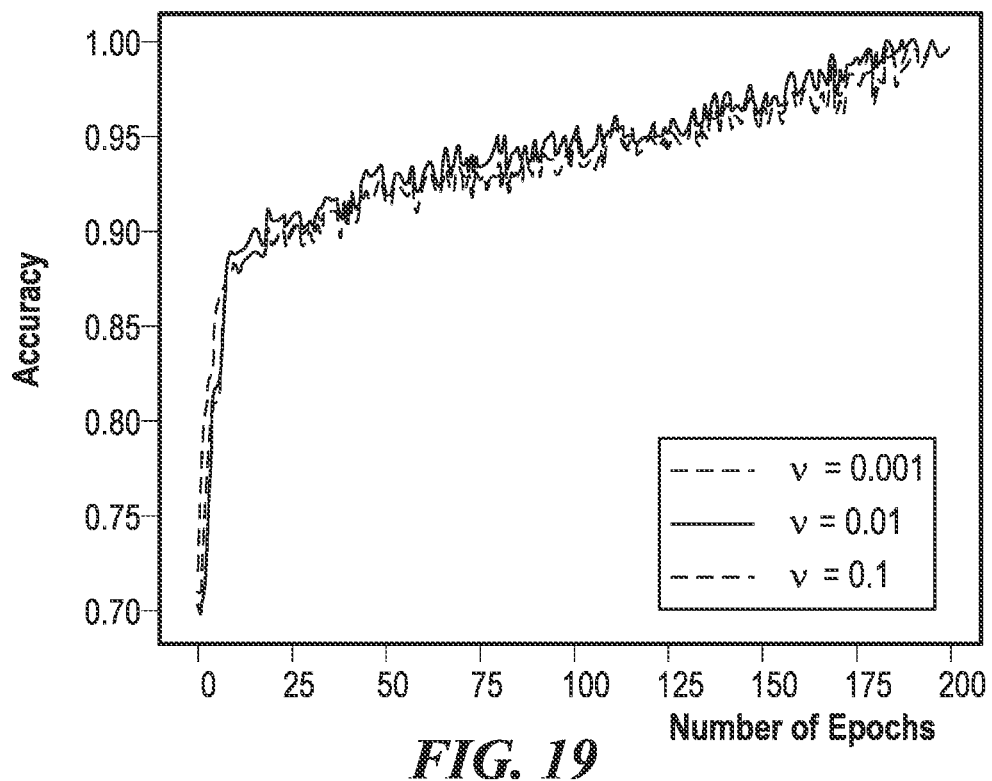
Figure 20:
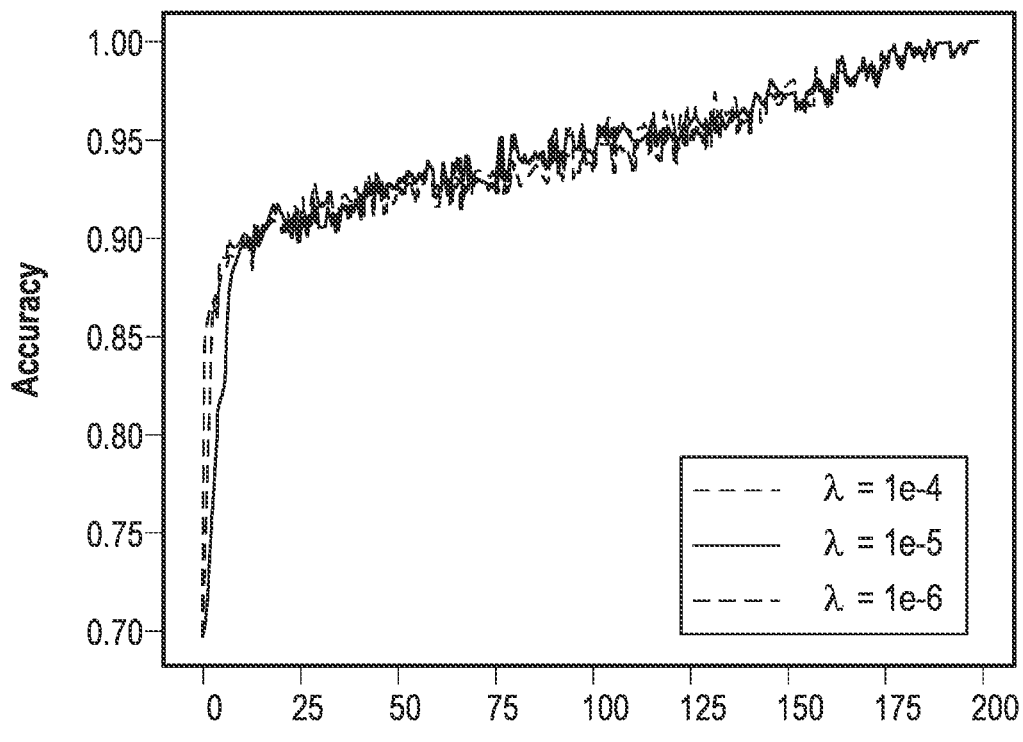

FIGS. 18-20 show the averaged accuracy curves under different hyperparameter settings. Based on those comparisons, it can be seen that the number of feature channels in graph convolution layers can affect convergence performance, while the other two hyperparameters do not have too much impact. Based on the results, the selected parameters are: 32 feature channels, v=0.01 and λ=$10^{-6}$.

Comparisons are then made with the first baseline to show the effectiveness of the disclosed IDS in detecting CAN message injection attacks. Note that in the original second and third dataset of the first baseline, data contents of injected CAN messages also get changed. In detail, all injected rpm and speed messages respectively end with "FFF" and "FFFF." In order to reflect the ability of the disclosed IDS to detect intrusions only changing statistical message sequences, one of normal messages with the same CAN ID is randomly selected in the same message interval, and its data content is used in the relevant injected CAN messages. These modifications simulate DoS attacks or bus-off attacks, which cannot be identified by IDSs considering CAN message contents. The comparison with the first baseline based on a 100 CAN message long interval is shown in Table II, in which the considered metrics include accuracy, precision, recall and F1-score. In this table, rpm and speed respectively represent those two corresponding attacks. CS, PC, LSTM-CS and LSTM-PC respectively represent the three kinds of intrusion detection strategies in the first baseline, i.e., thresholds for Cosine Similarity, thresholds for Pearson Correlation and statistical CAN message sequence reconstruction based on LSTM for intrusion detection. GNN corresponds to the disclosed IDS. Based on the comparison, it can be seen that the disclosed IDS can achieve even better performance than the first baseline in detecting CAN message injection attacks.

In order to evaluate the scalability of the disclosed IDS, the situation where message intervals have different lengths during intrusion detection, i.e., 150 and 200, is considered. The results are shown in TABLE III. From this table, it can be seen that the disclosed IDS can still achieve fairly high performance even when the length of message intervals during intrusion detection is different from the length during model training.

Finally, it is shown that message intervals longer than 200 can impact real-time performance of IDSs, since collecting 200 CAN messages will cost more than 100 milliseconds. The average prediction time of the disclosed IDS for each CAN message graph is 3 milliseconds.

FIGS. 18-20 show comparisons of GNN model hyperparameter settings related to the first baseline. FIG. 18 shows the accuracy for various numbers of feature channels. FIG. 19 shows the accuracy for various values of v in the Support Vector Data Description (SVDD) classifier. FIG. 20 shows the accuracy for various values of λ in the SVDD classifier.

TABLE II shows comparison results with the first baseline (in %). The anomaly threshold in the first baseline is set at 0.87.

TABLE II

COMPARISON RESULTS WITH THE FIRST BASELINE (IN %), ANOMALY THRESHOLD IN THE FIRST BASELINE: 0.87.

| Attack | IDS | Accuracy | Prediction | Recall | F1 |
| --- | --- | --- | --- | --- | --- |
| Rpm | CS | 96.65 | 91.40 | 96.59 | 93.92 |
|  | PC | 97.32 | 93.48 | 97.73 | 95.56 |
|  | LSTM-CS | 97.32 | 92.47 | 97.73 | 95.03 |
|  | LSTM-PC | 96.80 | 91.49 | 97.73 | 94.51 |
|  | GNN | 100 | 100 | 100 | 100 |
| Speed | CS | 89.20 | 68.29 | 88.89 | 77.24 |
|  | PC | 90.57 | 71.60 | 92.06 | 80.55 |
|  | LSTM-CS | 96.93 | 89.71 | 95.31 | 92.43 |
|  | LSTM-PC | 96.93 | 88.57 | 96.88 | 92.54 |
|  | GNN | 99.41 | 96.92 | 100 | 98.44 |

TABLE III shows a scalability evaluation (in %)

TABLE III

SCALABILITY EVALUATION (IN %)

| Attack | Interval Length | Accuracy | Prediction | Recall | F1 |
| --- | --- | --- | --- | --- | --- |
| Rpm | 150 | 97.65 | 93.48 | 97.73 | 95.56 |
|  | 200 | 97.06 | 92.39 | 96.59 | 94.44 |
| Speed | 150 | 94.71 | 80.60 | 85.71 | 83.08 |
|  | 200 | 96.43 | 87.14 | 96.83 | 91.73 |

CAN Message Contents

The related dataset used for the following results is first separated into a training set (the first 80%) and a test set (the last 20%). It is assumed here that the first 80% dataset covers most of vehicle states appearing in the last 20% of the whole data. This is validated by the following experimental results. As described above, the training set here also only contains normal CAN messages. The message interval length is set to 100 for both the training and test set. Although the second and third baseline consider CAN message contents for intrusion detection, they can both detect message injection (DoS and fuzzy), message suspension, and message falsification (replay and spoofing) attack at the same time. Therefore, all five attack types are applied in the test set for comprehensive comparisons. Those attacks are randomly deployed in different message intervals of the test set. GNN model hyperparameters and the mini-batch size are the same as those selected in the last subsection. Table IV shows related comparison results, where LSTM-P and CLAM respectively denote the second and third baseline.

TABLE IV shows comparison results with the second and third baseline (in %). The anomaly threshold in the second and third baselines is set at 0.83.

TABLE IV

COMPARISON RESULTS WITH THE SECOND AND THIRD BASELINE (IN %), ANOMALY THRESHOLD IN THE SECOND AND THIRD BASELINE: 0.83.

| Attack | IDS | Accuracy | Prediction | Recall | F1 |
|---|---|---|---|---|---|
| DoS | LSTM-P | 97.26 | 94.20 | 91.60 | 92.90 |
|  | CLAM | 98.75 | 95.70 | 97.10 | 96.40 |
|  | GNN | 100 | 100 | 100 | 100 |
| Fuzzy | LSTM-P | 97.10 | 93.30 | 93.30 | 92.80 |
|  | CLAM | 97.80 | 96.20 | 95.20 | 96.70 |
|  | GNN | 98.14 | 97.56 | 97.01 | 97.28 |
| Suspension | LSTM-P | 97.38 | 91.90 | 93.80 | 92.90 |
|  | CLAM | 97.90 | 93.90 | 94.90 | 94.40 |
|  | GNN | 99.72 | 98.88 | 99.73 | 99.30 |
| Replay | LSTM-P | 97.25 | 92.90 | 95.80 | 94.30 |
|  | CLAM | 97.75 | 94.90 | 95.80 | 95.30 |
|  | GNN | 97.73 | 94.71 | 95.66 | 95.18 |
| Spoofing | LSTM-P | 95.75 | 91.80 | 90.80 | 91.30 |
|  | CLAM | 97.00 | 94.80 | 92.90 | 93.80 |
|  | GNN | 97.91 | 96.10 | 94.30 | 95.19 |

From the results, it can be seen that in general, the disclosed IDS can achieve comparable performance to the second and third baseline. Message falsification attacks, i.e., replay and spoofing attacks, are harder to detect if related data contents only have slight changes compared with normal CAN message contents, which explains why the disclosed IDS performs a little less effective towards message falsification attacks. Considering the robustness of CAN bus, IDSs targeting statistical message sequences usually can achieve high performance, since injected CAN messages should overwhelm normal messages to take control of CAN buses, especially those DoS attacks, which will usually make significant changes to statistical message sequences. However, message falsification attacks can easily control CAN buses via slightly modifying normal CAN messages. For example, a speed change from 35 km/h to 40 km/h can trigger the activity of some ECUs, such as tire pressure sensors. It may be beneficial to balance the sensitivity of related IDSs in practical applications.

TABLE V shows comparison results for real-time performance.

TABLE V

REAL-TIME PERFORMANCE COMPARISON

| IDS | NoO | DCT (ms) | DT (ms) |
|---|---|---|---|
| LSTM-P | 100 per CAN ID | ≥991.20 | 7.6 |
| CLAM | 12 per CAN ID | ≥110.84 | 1.35 |
| GNN | 100 in total | 48.87 | 3.20 |

Although LSTM-P and CLAM can detect all the three kinds of attack at the same time, they both need a certain number of observations for each CAN ID to detect intrusions based on LSTM, which can induce high data collection delay and impact real-time performance. TABLE V shows a real-time performance comparison with them. In TABLE V, NoO, DCT, and DT respectively represent Number of Observations, Data Collection Time, and Detection Time for each intrusion detection. The NoO of LSTM-P and CLAM are the number for each CAN ID while the GNN corresponds to the total number of CAN messages. Based on these observations, even for CAN IDs with the highest message frequency, only 4 to 6 messages can be found in each 100 CAN messages. In this case, the total number of CAN messages required before each intrusion detection has to be larger than 200 in LSTM-P and CLAM, or over 2 times larger than the necessary number in the disclosed IDS. Such a number difference can further cause DCT difference, and seriously impact the real-time performance, which is also reflected in TABLE V. The DT of the disclosed IDS is 3.20 ms on average. Although it is larger than the DT of CLAM, the gap is almost negligible compared with the difference of DCT. The memory consumption of the first-stage classifier for intrusion detection is 354.6 KB, which is also less than that of LSTM-P (13,417 KB) and CLAM (682 KB).

Attack Type Classification

In this subsection, the performance of our second-stage classifier is evaluated using the same dataset as the previous subsection. In contrast to the previous subsection, the five attack types are applied uniformly to the whole dataset before training (80%) and test (20%) separation. The model training of the second-stage classifier is quite similar to that of the first-stage classifier except that the traditional softmax and cross-entropy function are respectively used as the output layer and loss function. The GNN has the same structure and hyperparameters as that in the first-stage classifier.

For specific attack type classification, the openmax layer is used. Initially, open world recognition, in which $c_0$ is not introduced and c is set to 0, is not considered.

Figure 21:
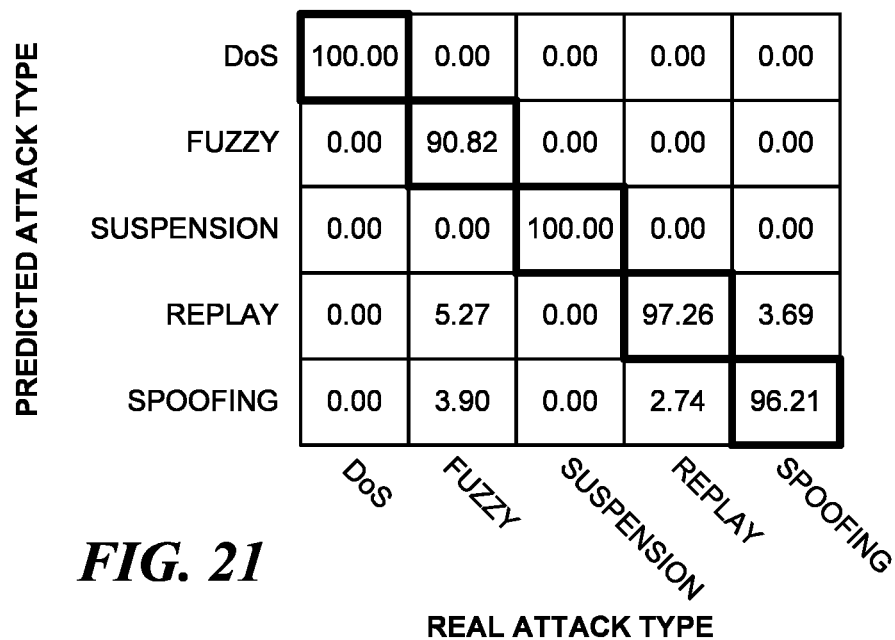
FIG. 21 shows an example confusion matrix, in accordance with various representative embodiments.

FIG. 21 shows a confusion matrix (in %) based on 4,740 attacked data samples, where each specific attack type owns 948 data samples. Based on the confusion matrix, it can be seen that the disclosed second-stage classifier works fairly well in identifying DoS and suspension attack, which can only cause difference in statistical CAN message sequences. On the other hand, replay and spoofing attack can be misclassified to each other because of CAN message content changes. It is sometimes difficult to determine whether an attacked data sample belongs to replay or spoofing attack. Spoofing and replay attack respectively use randomly generated and previously seen CAN messages to replace normal ones. Randomly generated CAN messages can sometimes be similar to, or even the same as, those previously seen messages. The situation of fuzzy attack is also complicated. Different from DoS and suspension attack, which usually focus on a single CAN ID, fuzzy attack randomly generates several CAN IDs. If a specific fuzzy attack does not cause an obvious change on the statistical CAN message sequence, it will be quite similar to a fuzzy or replay attack, which causes misclassifications shown in FIG. 21.

Next, the ability of the second-stage classifier in identifying new anomalies from unknown classes is evaluated. Here, one attack type is left as the "unknown" class and the other four attack types are considered during model training. For each targeted attack type, the most proper probability threshold c in METHOD 1 is determined based on the optimal cut-point in the corresponding receiver operating characteristic (ROC) curve.

TABLE VI shows the evaluation results. Note that here, the four attack types used are combined in model training to a "general" class, through which the open world recognition problem can be seen as a two-class classification problem. In general, the second-stage classifier can effectively identify new anomalies different from any existing attack type, which usually infers unknown classes. Besides, fuzzy, replay and spoofing attack sometimes are difficult to identify when they are considered as the "unknown" class.

TABLE VI

OPEN WORLD RECOGNITION PERFORMANCE EVALUATION (IN %)

| Attack | Accuracy | Prediction | Recall | F1 |
|---|---|---|---|---|
| DoS | 100 | 100 | 100 | 100 |
| Fuzzy | 87.13 | 62.86 | 87.13 | 73.03 |
| Suspension | 100 | 100 | 100 | 100 |
| Replay | 95.45 | 84.01 | 95.36 | 89.33 |
| Spoofing | 93.38 | 77.90 | 93.35 | 84.93 |

Effect of Federated Learning

Figure 22:
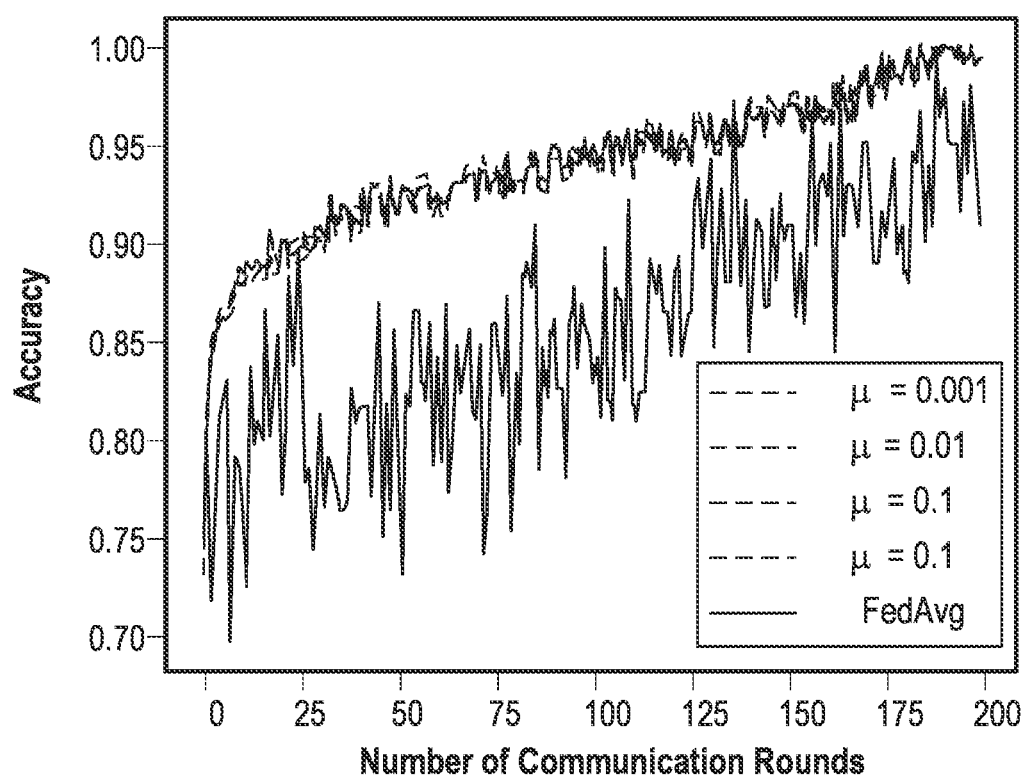
FIG. 22 shows a comparison of Hyperparameter settings related to federated learning, in accordance with various representative embodiments.

As has been discussed previously, vehicle states can affect statistical CAN message sequences and message contents. In this subsection, the impact of federated learning on intrusion detection performance improvement is evaluated based on the first-stage classifier. Related experiments are conducted based on datasets in the first baseline. The first dataset is split into 10 portions for local training to simulate an environment with 10 vehicles. The second and third dataset are still used as test sets. The GNN model hyperparameters and the mini-batch batch size are the same as before in each simulated vehicle. The center of the hypersphere o in the one-class classification layer is set to the average of local centers derived from all simulated vehicles. First experiments are conducted to explore the hyperparameter settings in FedProx, which are illustrated in FIG. 22, which shows a comparison of Hyperparameter setting related to federated learning. Ten-fold cross validation is still utilized here. Considering that federated learning has model parameter aggregation after local training, accuracies are indexed by the number of communication rounds instead of epochs. Based on comparison results, it can be seen that p does not have too much impact on convergence performance, and $\mu=0.01$ is selected in the following experiments. The convergence performance of FedAvg is included to show the improvement of FedProx.

TABLE VII shows the accuracy comparisons based on test sets and GNN model parameters after 120 communication rounds.

TABLE VII

ACCURACY COMPARISON OF FEDERATED LEARNING (IN %)

| | | Without FL | FedAvg | FedProx | Centralized |
|---|---|---|---|---|---|
| Rpm | 100 | 32.01 | 80.03 | 99.04 | 100 |
| | 150 | 34.32 | 81.35 | 94.65 | 97.65 |
| | 200 | 36.30 | 88.61 | 97.65 | 97.06 |
| Speed | 100 | 33.33 | 78.82 | 99.41 | 99.41 |
| | 150 | 29.04 | 74.71 | 97.62 | 94.71 |
| | 200 | 37.29 | 84.98 | 98.82 | 96.43 |

For the situation without considering federated learning (without FL), only data in the first simulated vehicle is used for training. Based on the comparisons, it can be seen that intrusion detection performance can get degraded if training sets only cover limited vehicle states. In a practical application, such situations can happen if only one vehicle having limited driving scenarios is tracked. However, this issue can be solved by collecting and integrating multiple local models derived from different vehicles. For more comprehensive comparison, a traditional centralized learning scenario can be included. It can be seen that the convergence performance of FedProx is comparable to that of centralized learning. Similar trends can be identified for the second-stage classifier.

The disclosed CAN bus IDS is based on a graph neural network GNN, which can efficiently detect CAN message injection, suspension, and falsification attacks at the same time. A CAN message graph is developed to integrate statistical message sequences with message contents. A GNN fit for directed attributed graphs is constructed and trained to predict intrusions. A two-stage classifier cascade is used to tackle normal and attacked CAN data respectively. This is useful since attack data are hard to acquire in the real world and may cause highly imbalanced training sets. In the first-stage classifier, a one-class classification layer is used for anomaly detection in GNN rather than a conventional softmax layer. The GNN may be trained with only normal CAN messages. Once anomaly CAN data are spotted, they are further passed to the second-stage classifier to determine the specific attack type, in which an openmax layer is introduced to tackle anomalies from potential unknown classes. Changes of vehicle states can affect CAN message graph patterns in a reasonable way. In this case, federated learning is considered to cover a wide range of driving scenarios and vehicle states while protecting user data privacy. The disclosed IDS has been validated based on several real-world datasets and compared with three baselines. Experimental results show that the disclosed IDS can achieve similar performance to those IDSs only based on statistical CAN message sequences and message contents.

As is shown in FIG. 4, once anomalies are rejected as belonging to unknown classes, they are buffered for further analysis. If necessary, new anomalies can be further tackled by transfer learning or extra one-class classifier training. In the example results presented above, it is assumed that all vehicles participating in federated learning are from the same model. The lack of relevant public specifications can cause large divergence on CAN message streams from different vehicle models, which further brings challenges to the related machine learning model design. It may be advantageous to separate different vehicle models through hierarchical structures.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or," as used herein, is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

As used herein, the term "configured to," when applied to an element, means that the element may be designed or constructed to perform a designated function, or that is has the required structure to enable it to be reconfigured or adapted to perform that function.

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Those skilled in the art will recognize that the present disclosure has been described by means of examples. The present disclosure could be implemented using hardware component equivalents such as special purpose hardware and/or dedicated processors which are equivalents to the present disclosure as described and claimed. Similarly, dedicated processors and/or dedicated hard wired logic may be used to construct alternative equivalent embodiments of the present disclosure.

Dedicated or reconfigurable hardware components used to implement the disclosed mechanisms may be described, for example, by instructions of a hardware description language (HDL), such as VHDL, Verilog or RTL (Register Transfer Language), or by a netlist of components and connectivity. The instructions may be at a functional level or a logical level or a combination thereof. The instructions or netlist may be input to an automated design or fabrication process (sometimes referred to as high-level synthesis) that interprets the instructions and creates digital hardware that implements the described functionality or logic.

The HDL instructions or the netlist may be stored on non-transitory computer readable medium such as Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations carried out can often be varied, additional operations can be added, or operations can be deleted without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

REFERENCES

[1] M. Jedh, L. ben Othmane, N. Ahmed, and B. Bhargava, "Detection of message injection attacks onto the CAN bus using similarity of successive messages-sequence graphs," *arXiv:* 2104.03763, 2021.

[2] R. Islam, R. U. D. Refat, S. M. Yerram, and H. Malik, "Graph-based intrusion detection system for controller area networks," *IEEE Trans. Intell. Transp. Syst. (Early Access)*, pp. 1-10, 2020.

[3] H. M. Song, H. R. Kim, and H. K. Kim, "Intrusion detection system based on the analysis of time intervals of CAN messages for in-vehicle network," in *Proc. Int. Conf. Inf. Netw.*, 2016, pp. 63-68.

[4] A. Taylor, N. Japkowicz, and S. Leblanc, "Frequency-based anomaly detection for the automotive CAN bus," in *Proc. World Congress on Industrial Control Systems Secur.*, 2015, pp. 45-49.

[5] M. Marchetti and D. Stabili, "Anomaly detection of CAN bus messages through analysis of ID sequences," in *Proc. IEEE Intell. Veh. Symp.*, 2017, pp. 1577-1583.

[6] E. Seo, H. M. Song, and H. K. Kim, "GIDS: GAN based intrusion detection system for in-vehicle network," in *Proc. Annual Conf. Priv., Secur. and Trust*, 2018, pp. 1-6.

[7] M. Muter and N. Asaj, "Entropy-based anomaly detection for in-vehicle networks," in *Proc. Intell. Veh. Symp.*, 2011, pp. 1110-1115.

[8] M. Marchetti, D. Stabili, A. Guido, and M. Colajanni, "Evaluation of anomaly detection for in-vehicle networks through information theoretic algorithms," in *Proc. IEEE Int. Forum on Research and Technologies for Society and Industry Leveraging a Better Tmrw.*, 2016, pp. 1-6.

[9] D. Kosmano et al., "A novel intrusion detection system against spoofing attacks in connected electric vehicles," *Array*, vol. 5, no. 100013, pp. 1-11, 2020.

[10] F. Amato et al., "CAN-bus attack detection with deep learning," *IEEE Trans. Intell. Transp. Syst. (Early Access)*, pp. 1-10,2021.

[11] M.-J. Kang and J.-W. Kang, "A novel intrusion detection method using deep neural network for in-vehicle network security," in *Proc. IEEE Veh. Technol. Conf.*, 2016, pp. 1-5.

[12] B. Groza and P.-S. Murvay, "Efficient intrusion detection with bloom filtering in controller area networks," *IEEE Trans. Inf. Forensics Secur.*, vol. 14, no. 4, pp. 1037-1051,2018.

[13] Taylor, S. Leblanc, and N. Japkowicz, "Anomaly detection in auto-mobile control network data with long short-term memory networks," in *Proc. IEEE Int. Conf. Data Science and Advanced Analytics*, 2016, pp. 130-139.

[14] S. Longari et al., "CANnolo: An anomaly detection system based on LSTM autoencoders for controller area network," *IEEE Trans. Netw. Serv. Manag.*, vol. 18, no. 2, pp. 1913-1924, 2020.

[15] L. Yang, A. Moubayed, I. Hamieh, and A. Shami, "Tree-based intelligent intrusion detection system in internet of vehicles," in *Proc. IEEE Global Comms. Conf.*, 2019, pp. 1-6.

What is claimed is:

1. A computer-implemented method comprising:
generating graph data from a sequence of messages in a communication network, each message including data content and a message identifier, the graph data denoting:
   a node for each message identifier in the sequence of messages; and
   an edge for each pair of consecutive message identifiers in the sequence of messages, the edge linking two nodes;
for edges in the graph data, generating a pair count as a number of times the associated pair of consecutive message identifiers occurs in the sequence of messages;
for nodes in the graph data, generating an input feature vector including:
   data content of messages that include the message identifier associated with the node; and
   a pair count for each edge connected to the node;
processing the input feature vectors through a first graph neural network, based on the graph data, to produce first output feature vectors; and
classifying the sequence of messages as containing an anomaly or not, including processing the first output feature vectors through one or more first output layers.

2. The computer-implemented method of claim 1, further comprising:
monitoring the sequence of messages in the communication network; and
raising an alarm when the sequence of messages is classified containing an anomaly.

3. The computer-implemented method of claim 1, where the edges are directed edges.

4. The computer-implemented method of claim 1, where the one or more first output layers include a one-class classifier.

5. The computer-implemented method of claim 1, where the first graph neural network includes a plurality of first network weights, the method further comprising:
training the first network weights using a dataset of messages without anomalies.

6. The computer-implemented method of claim 1, further comprising:
when the sequence of messages contains an anomaly:
   processing the input feature vectors using a second graph neural network, based on the graph data, to produce second output feature vectors; and
   classifying the anomaly, including processing the second output feature vectors through one or more second output layers.

7. The computer-implemented method of claim 6, where the one or more second output layers include an "openmax" layer.

8. The computer-implemented method of claim 6, where the second graph neural network includes a plurality of second network weights, the method further comprising:
training the second network weights using a dataset of messages with known anomalies.

9. The computer-implemented method of claim 6, further comprising:
when the sequence of messages contains an anomaly:
   initiating a mitigation action based on the classification of the anomaly.

10. The computer-implemented method of claim 1, where the first graph neural network includes a node for each message identifier in a protocol of the communication network.

11. The computer-implemented method of claim 1, further comprising:
extracting the data content of an input feature vector from a message payload based on identified data block boundaries in the message payload.

12. An apparatus comprising:
one or more computers configured to receive a sequence of messages from a communication network, each message including data content and a message identifier;
a non-transitory computer-readable medium coupled to the one or more computers and having instructions stored thereon, which, when executed by the one or more computers, cause the one or more computers to:
   generate graph data from the sequence, the graph data denoting:
      a node for each message identifier in the sequence of messages; and
      an edge for each pair of consecutive message identifiers in the sequence of messages, the edge linking two nodes;
   for edges in the graph data, generate a pair count as a number of times the associated pair of consecutive message identifiers occurs in the sequence of messages;
   for nodes in the graph data, generate an input feature vector including:
      data content of messages that include the message identifier associated with the node; and
      a pair count for each edge connected to the node;
   process the input feature vectors using a first graph neural network, based on the graph data, to produce first output feature vectors; and
   classify the sequence of messages as containing an anomaly or not, including processing the first output feature vectors through one or more first output layers.

13. The apparatus of claim 12, where the one or more computers are coupled to the communication network.

14. The apparatus of claim 12, further comprising the communication network.

15. The apparatus of claim 12, where the communication network comprises a Controller Area Network (CAN) bus.

16. The apparatus of claim 12, where the instructions, when executed by the one or more computers, cause the one or more computers to:
when the sequence of messages contains an anomaly:
process the input feature vectors using a second graph neural network, based on the graph data, to produce second output feature vectors; and
classify the anomaly, including processing the second output feature vectors through one or more second output layers.

17. An apparatus comprising:
a memory
a message graph generator configured to receive a sequence of messages of a communication network, each message including data content and a message identifier, and generate therefrom:
graph data denoting:
a node for each message identifier in the sequence of messages; and an edge for each pair of consecutive message identifiers in the sequence of messages, the edge linking two nodes;
a pair count for each edge in the graph data denoting a number of times an associated pair of consecutive message identifiers occurs in the sequence of messages;
an input feature vector for each node in the graph data, the input feature vector denoting:
data content of messages that include the message identifier associated with the node; and
a pair count for each edge connected to the node;
an anomaly detector configured to:
process the input feature vectors using a first graph neural network, based on the graph data, to produce first output feature vectors; and
classify the sequence of messages as containing an anomaly or not, including processing the first output feature vectors through one or more first output layers.

18. The apparatus of claim 17, further comprising an anomaly classifier configured to:
process the input feature vectors using a second graph neural network, based on the graph data, to produce second output feature vectors; and
classify the anomaly, including processing the second output feature vectors through one or more second output layers.

19. The apparatus of claim 17, further comprising a receiver configured to couple between the communication network and the message graph generator.

20. The system of claim 17, further comprising the communication network, where the communication network comprises a Controller Area Network (CAN) bus.

* * * * *